(12) United States Patent
Li et al.

(10) Patent No.: US 12,512,452 B2
(45) Date of Patent: *Dec. 30, 2025

(54) ELECTRODE PLATE, ELECTROCHEMICAL APPARATUS, BATTERY MODULE, BATTERY PACK, AND DEVICE

(71) Applicant: CONTEMPORARY AMPEREX TECHNOLOGY (HONG KONG) LIMITED, Hong Kong (CN)

(72) Inventors: Jing Li, Ningde (CN); Wei Li, Ningde (CN); Qingrui Xue, Ningde (CN); Zige Zhang, Ningde (CN); Xianwei Yang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 977 days.

This patent is subject to a terminal disclaimer.

(21) Appl. No.: 17/112,766

(22) Filed: Dec. 4, 2020

(65) Prior Publication Data

US 2021/0119196 A1    Apr. 22, 2021

Related U.S. Application Data

(63) Continuation of application No. PCT/CN2019/119739, filed on Nov. 20, 2019.

(30) Foreign Application Priority Data

Dec. 29, 2018    (CN) .......................... 201811642323.5

(51) Int. Cl.
   *H01M 4/04*    (2006.01)
   *H01M 4/136*   (2010.01)
   (Continued)

(52) U.S. Cl.
   CPC ......... *H01M 4/0404* (2013.01); *H01M 4/136* (2013.01); *H01M 4/621* (2013.01);
   (Continued)

(58) Field of Classification Search
   None
   See application file for complete search history.

(56) References Cited

U.S. PATENT DOCUMENTS 4,492,021 A    1/1985    Wright
5,478,676 A    12/1995   Turi et al.
(Continued)

FOREIGN PATENT DOCUMENTS

CN    1579028 A    2/2005
CN    1669163 A    9/2005
(Continued)

OTHER PUBLICATIONS

Contemporary Amperex Technology Co., Limited, International Search Report and Written Opinion, PCTCN2019119739, Jan. 14, 2020, 14 pgs.
(Continued)

*Primary Examiner* — Amanda J Barrow
(74) *Attorney, Agent, or Firm* — K&L Gates LLP

(57) ABSTRACT

This application relates to an electrode plate, an electrochemical apparatus, a battery module, a battery pack, and a device. The electrode plate includes a current collector and an electrode active material layer disposed on at least one surface of the current collector. The current collector includes a support layer and a conductive layer disposed on at least one surface of the support layer, a single-sided thickness D2 of the conductive layer satisfies: 30 nm≤D2≤3 µm; and a conductive primer layer containing a conductive material and a binder is disposed between the current collector and the electrode active material layer, the binder
(Continued)

in the conductive primer layer containing an acrylic based/ acrylate based water-dispersible binder. The electrode plate of this application has good quality, and the electrochemical apparatus containing the electrode plate has a high energy density and a good electrical performance and long-term reliability.

18 Claims, 5 Drawing Sheets

(51) Int. Cl.
    *H01M 4/62* (2006.01)
    *H01M 4/66* (2006.01)
    *H01M 10/42* (2006.01)
(52) U.S. Cl.
    CPC .......... *H01M 4/625* (2013.01); *H01M 4/662* (2013.01); *H01M 4/667* (2013.01); *H01M 10/4235* (2013.01)

(56) References Cited

U.S. PATENT DOCUMENTS

| | | | |
|---|---|---|---|
| 5,645,959 A | 7/1997 | Rowlette | |
| 6,022,642 A | 2/2000 | Tsukamoto | |
| 6,420,066 B1 | 7/2002 | Frustaci | |
| 8,323,831 B2 | 12/2012 | Wilkins et al. | |
| 8,691,445 B2 | 4/2014 | Park | |
| 8,785,053 B2 | 7/2014 | Wang | |
| 9,786,904 B2 | 10/2017 | Park | |
| 11,769,883 B2 * | 9/2023 | Liang | H01M 4/668 429/217 |
| 2002/0160265 A1 | 10/2002 | Hashimoto | |
| 2004/0126654 A1 | 7/2004 | Sudano | |
| 2004/0126663 A1 | 7/2004 | Sudano | |
| 2004/0258997 A1 | 12/2004 | Utsugi | |
| 2005/0221190 A1 | 10/2005 | Sudano | |
| 2006/0019168 A1 | 1/2006 | Li | |
| 2006/0105243 A1 | 5/2006 | Okamura | |
| 2006/0127773 A1 * | 6/2006 | Kawakami | H01M 4/1395 29/623.5 |
| 2006/0206186 A1 | 9/2006 | Mori et al. | |
| 2006/0263691 A1 | 11/2006 | Park | |
| 2007/0224502 A1 | 9/2007 | Affinito | |
| 2009/0305135 A1 | 12/2009 | Shi | |
| 2010/0075223 A1 * | 3/2010 | Hwang | H01M 4/661 429/209 |
| 2010/0075225 A1 | 3/2010 | Wilkins et al. | |
| 2010/0129699 A1 | 5/2010 | Mikhaylik | |
| 2010/0291442 A1 * | 11/2010 | Wang | H01M 10/052 429/231.95 |
| 2011/0200884 A1 | 8/2011 | Uchida | |
| 2012/0164528 A1 | 6/2012 | Xu et al. | |
| 2012/0208082 A1 * | 8/2012 | Honda | H01M 4/667 429/210 |
| 2012/0237824 A1 | 9/2012 | Koh | |
| 2013/0045413 A1 | 2/2013 | Wang | |
| 2013/0171523 A1 | 7/2013 | Chen | |
| 2014/0072873 A1 | 3/2014 | Wang | |
| 2014/0154580 A1 | 6/2014 | Park | |
| 2014/0162138 A1 | 6/2014 | Fujiki | |
| 2014/0291442 A1 | 10/2014 | Laks et al. | |
| 2014/0370349 A1 | 12/2014 | Kwon | |
| 2014/0370350 A1 | 12/2014 | Kwon | |
| 2015/0221452 A1 | 8/2015 | Iida et al. | |
| 2015/0280241 A1 | 10/2015 | Hara | |
| 2015/0303485 A1 | 10/2015 | Kim | |
| 2016/0181620 A1 | 6/2016 | Kim | |
| 2016/0211524 A1 | 7/2016 | Hao | |
| 2016/0351892 A1 | 12/2016 | Sugimori | |
| 2017/0033399 A1 | 2/2017 | Fujisawa | |
| 2017/0324077 A1 * | 11/2017 | Liu | H01M 4/485 |
| 2017/0338493 A1 * | 11/2017 | Shin | H01G 11/84 |
| 2017/0353585 A1 | 12/2017 | Krishnan | |
| 2018/0006291 A1 | 1/2018 | Kim | |
| 2018/0006307 A1 * | 1/2018 | Song | H01M 10/399 |
| 2018/0069229 A1 | 3/2018 | Ko | |
| 2018/0145317 A1 | 5/2018 | Momma et al. | |
| 2018/0198132 A1 * | 7/2018 | Liang | H01M 4/663 |
| 2018/0205115 A1 | 7/2018 | Haba | |
| 2018/0219212 A1 | 8/2018 | Seol | |
| 2018/0287158 A1 | 10/2018 | Ma | |
| 2018/0301709 A1 | 10/2018 | Qiu | |
| 2019/0173090 A1 * | 6/2019 | Liang | H01M 4/75 |
| 2019/0173092 A1 * | 6/2019 | Liang | H01M 4/662 |
| 2019/0245210 A1 * | 8/2019 | Matsushita | H01M 4/82 |
| 2019/0393511 A1 | 12/2019 | Zhou | |
| 2020/0083527 A1 | 3/2020 | Nakamura | |
| 2020/0083542 A1 | 3/2020 | Yushin | |
| 2020/0295377 A1 * | 9/2020 | Liang | H01M 4/667 |
| 2020/0388875 A1 * | 12/2020 | Kano | H01M 50/489 |
| 2020/0403247 A1 | 12/2020 | Turi | |
| 2021/0066691 A1 | 3/2021 | Asai | |
| 2021/0119196 A1 | 4/2021 | Li | |
| 2021/0119218 A1 * | 4/2021 | Li | H01M 4/662 |
| 2021/0119221 A1 * | 4/2021 | Li | H01M 50/209 |
| 2021/0151769 A1 * | 5/2021 | Li | H01M 4/134 |
| 2021/0151772 A1 * | 5/2021 | Li | H01M 4/366 |
| 2021/0167397 A1 * | 6/2021 | Kim | H01M 4/0438 |
| 2021/0210763 A1 * | 7/2021 | Li | H01M 4/0404 |
| 2021/0288329 A1 * | 9/2021 | Liang | H01M 4/13 |
| 2021/0296654 A1 * | 9/2021 | Liang | H01M 4/13 |
| 2021/0320322 A1 | 10/2021 | Yasuda | |
| 2022/0037663 A1 | 2/2022 | Tamaki | |
| 2022/0037667 A1 * | 2/2022 | Li | H01M 10/052 |
| 2022/0037669 A1 * | 2/2022 | Li | H01M 4/1391 |
| 2022/0037670 A1 * | 2/2022 | Li | H01M 4/623 |
| 2022/0037672 A1 * | 2/2022 | Xue | H01M 4/662 |
| 2022/0093932 A1 * | 3/2022 | Li | H01M 4/625 |

FOREIGN PATENT DOCUMENTS

| | | | |
|---|---|---|---|
| CN | 1855588 A | 11/2006 | |
| CN | 101071860 A | 11/2007 | |
| CN | 101174685 A | 5/2008 | |
| CN | 101207197 A | 6/2008 | |
| CN | 101627494 A | 1/2010 | |
| CN | 101884125 A | 11/2010 | |
| CN | 102195032 A | 9/2011 | |
| CN | 102306800 A | 1/2012 | |
| CN | 102332558 A | 1/2012 | |
| CN | 102569816 A | 7/2012 | |
| CN | 102847859 A | 1/2013 | |
| CN | 103131267 A | 6/2013 | |
| CN | 103165863 A | 6/2013 | |
| CN | 103268942 A | 8/2013 | |
| CN | 103326029 A | 9/2013 | |
| CN | 203218375 U | 9/2013 | |
| CN | 103545530 A | 1/2014 | |
| CN | 103779569 A | 5/2014 | |
| CN | 103956499 A | 7/2014 | |
| CN | 104303344 A | 1/2015 | |
| CN | 104321907 A | 1/2015 | |
| CN | 204088469 U | 1/2015 | |
| CN | 103094619 B | 2/2015 | |
| CN | 104659368 A | 5/2015 | |
| CN | 105027347 A | 11/2015 | |
| CN | 105406083 A | 3/2016 | |
| CN | 105489845 A | 4/2016 | |
| CN | 105493323 A | 4/2016 | |
| CN | 105514349 A | 4/2016 | |
| CN | 105895193 A | 8/2016 | |
| CN | 106463698 A | 2/2017 | |
| CN | 106654285 A | 5/2017 | |
| CN | 106848324 A | 6/2017 | |
| CN | 106935901 * | 7/2017 | ........ H01M 10/0525 |
| CN | 106935901 A | 7/2017 | |
| CN | 106941149 A | 7/2017 | |
| CN | 106981665 A | 7/2017 | |
| CN | 107123812 A | 9/2017 | |
| CN | 107154499 A | 9/2017 | |
| CN | 107221676 A | 9/2017 | |

(56) References Cited

FOREIGN PATENT DOCUMENTS

| | | | |
|---|---|---|---|
| CN | 107240721 A | 10/2017 | |
| CN | 107302094 A | 10/2017 | |
| CN | 107431186 A | 12/2017 | |
| CN | 107437622 A | 12/2017 | |
| CN | 107565137 A | 1/2018 | |
| CN | 107732146 A | 2/2018 | |
| CN | 107768677 A | 3/2018 | |
| CN | 107851836 A | 3/2018 | |
| CN | 207097950 U | 3/2018 | |
| CN | 104428928 A | 4/2018 | |
| CN | 104428928 B | 4/2018 | |
| CN | 107925056 A | 4/2018 | |
| CN | 108155363 A | 6/2018 | |
| CN | 108199005 A | 6/2018 | |
| CN | 108258249 A | 7/2018 | |
| CN | 108281662 A | 7/2018 | |
| CN | 108306013 A | 7/2018 | |
| CN | 108539252 A | 9/2018 | |
| CN | 108598491 A | 9/2018 | |
| CN | 108666525 A | 10/2018 | |
| CN | 108682788 A | 10/2018 | |
| CN | 108832134 A | 11/2018 | |
| CN | 109004171 A | 12/2018 | |
| CN | 109103490 A | 12/2018 | |
| CN | 208298924 U | 12/2018 | |
| CN | 109216675 A | 1/2019 | |
| CN | 109216703 A | 1/2019 | |
| CN | 109273668 A | 1/2019 | |
| CN | 208507818 U | 2/2019 | |
| CN | 109546154 A | 3/2019 | |
| CN | 109546204 A | 3/2019 | |
| CN | 109873160 U | 6/2019 | |
| CN | 109873161 A | 6/2019 | |
| CN | 109873163 A | 6/2019 | |
| CN | 109873164 A | 6/2019 | |
| CN | 109873166 A | 6/2019 | |
| CN | 208955108 U | 6/2019 | |
| CN | 110660957 B | 12/2020 | |
| CN | 110661001 B | 12/2020 | |
| EP | 1551070 A1 | 7/2005 | |
| EP | 2903063 A1 | 8/2015 | |
| EP | 3182487 A1 | 6/2017 | |
| EP | 3367485 A1 | 8/2018 | |
| EP | 3389122 A1 | 10/2018 | |
| EP | 3796423 A1 | 3/2021 | |
| EP | 3796436 A1 | 3/2021 | |
| JP | H1167277 A | 3/1999 | |
| JP | 2003282064 A | 10/2003 | |
| JP | 2003297353 A | 10/2003 | |
| JP | 2008258055 A | 10/2008 | |
| JP | 2010027530 A | 2/2010 | |
| JP | 2011165388 A | 8/2011 | |
| JP | 2013254692 A | 12/2013 | |
| JP | 2015115233 A | 6/2015 | |
| JP | 2017021888 A | 1/2017 | |
| JP | 2018049825 A | 3/2018 | |
| JP | 2018073723 A | 5/2018 | |
| JP | 2018156787 A | 10/2018 | |
| JP | 2018174107 A | 11/2018 | |
| JP | 2018190656 A | 11/2018 | |
| KR | 20140137660 A | 12/2014 | |
| KR | 20180000183 A | 1/2018 | |
| WO | 2008115168 A2 | 9/2008 | |
| WO | 2011029058 A2 | 3/2011 | |
| WO | 2012127561 A1 | 9/2012 | |
| WO | 2015020338 A1 | 2/2015 | |
| WO | 2018180742 A1 | 10/2018 | |
| WO | 2018/207643 * | 11/2018 | ............ H01M 10/04 |
| WO | 2019109928 A1 | 6/2019 | |

OTHER PUBLICATIONS

Contemporary Amperex Technology Co., Limited, Extended European Search Report, EP19902406.8, Aug. 5, 2021, 7 pgs.

Ningder Age New Energy Technology Co., Ltd., First Office Action, CN201811642323.5, Jun. 3, 2020, 14 pgs.
The extended European search report received in the corresponding European Application 19933228.9, mailed Sep. 30, 2021.
The first office action received in the corresponding Chinese Application 201910586647.X, mailed Jun. 16, 2023.
The notification to grant patent right for invention eceived in the corresponding Chinese Application 201910586647.X, mailed Aug. 15, 2023.
MatWeb, Material Property Data Sheet for Aluminum, 2021.
The non-final office action received in the corresponding U.S. Appl. No. 17/139,124, mailed Mar. 19, 2021.
The non-final office action received in the corresponding U.S. Appl. No. 17/139,124, mailed Aug. 10, 2022.
MatWeb, Datasheet for Aluminum, 2022.
The final office action received in the corresponding U.S. Appl. No. 17/139,124, mailed Apr. 11, 2022.
The notice of allowance received in the corresponding U.S. Appl. No. 17/139,124, mailed Aug. 23, 2023.
The international search report received in the corresponding International Application PCT/CN2019/119700, mailed Feb. 19, 2020.
The written opinion of ISA received in the corresponding International Application PCT/CN2019/119700, mailed Feb. 19, 2020.
The extended European search report received in the corresponding European Application 19902910.9, mailed Jul. 8, 2021.
The first office action received in the corresponding Chinese Application 201811637655.4, mailed Jun. 16, 2020.
The third office action received in the corresponding Chinese Application 201811638645.2, mailed Sep. 18, 2021.
Eunice K Wong et al:"Battery Separator Characterization and Evaluation Procedures for NASA's Advanced Lithium-Ion Batteries", published May 1, 2010.
Pszczolkowski Bartosz et al:"A Comparative Analysis of Selected Methods for Determining Young's Modulus in Polylactic Acid Samples Manufactured with the FDM Method" Materials, vol. 15, No. 1, Dec. 25, 2021 (Dec. 25, 2021), p. 149, XP093019570, DOI: 10.3390/ma15010149.
"Temperature-Compensated Crystal Oscillator" Elektor Electronics Elektor Electronics GB vol. 25, No. 279, Jul. 1, 1999, p. 54/55.
The international search report received in the corresponding International Application PCT/CN2019/117141, mailed Feb. 5, 2020.
The written opinion of ISA received in the corresponding International Application PCT/CN2019/117141, mailed Feb. 5, 2020.
The extended European search report received in the corresponding European Application 19905422.2, mailed Sep. 9, 2021.
The first office action received in the corresponding Chinese Application 201811638781.1, mailed Jun. 4, 2020.
The final office action received in the corresponding U.S. Appl. No. 17/112,749, mailed Mar. 14, 2014.
The international search report received in the corresponding International Application PCT/CN2019/117142, mailed Feb. 3, 2020.
The written opinion of ISA received in the corresponding International Application PCT/CN2019/117142, mailed Feb. 3, 2020.
The first office action received in the corresponding Chinese Application 201811644245.2, mailed Jun. 9, 2020.
The extended European search report received in the corresponding European Application 19905423.0, mailed Sep. 10, 2021.
Pszczółkowski Bartosz et al: "A Comparative Analysis of Selected Methods for Determining Young's Modulus in Polylactic Acid Samples Manufactured with the FDM Method", Materials, vol. 15, No. 1, Dec. 25, 2021 (Dec. 25, 2021) , p. 149.
The first office action received in the corresponding European Application 19905423.0, mailed Feb. 6, 2023.
The final office action received in the corresponding U.S. Appl. No. 17/132,548, mailed Jun. 6, 2023.
The international search report received in the corresponding International Application PCT/CN2019/117143, mailed Mar. 11, 2020.
The written opinion of ISA received in the corresponding International Application PCT/CN2019/117143, mailed Mar. 11, 2020.
The extended European search report received in the corresponding European Application 19906208.4, mailed Sep. 10, 2021.
The first office action received in the corresponding Chinese Application 201811638645.2, mailed Jun. 16, 2020.

(56) References Cited

OTHER PUBLICATIONS

The third office action received in the corresponding Chinese Application 201811644244.8, mailed Jan. 12, 2021.
The extended European search report received in the corresponding European Application 19903066.9, mailed Jul. 19, 2021.
The non-final office action received in the corresponding U.S. Appl. No. 17/059,503, mailed Aug. 30, 2023.
The international search report received in the corresponding International Application PCT/CN2019/119717, mailed Jan. 23, 2020.
The written opinion of ISA received in the corresponding International Application PCT/CN2019/119717, mailed Jan. 23, 2020.
The first office action received in the corresponding Chinese Application 201811638405.2, mailed Jun. 9, 2020.
The extended European search report received in the corresponding European Application 19902246.8, mailed Nov. 29, 2021.
The first office action received in the corresponding European Application 19902246.8, mailed Jul. 1, 2022.
The non-final office action received in the corresponding U.S. Appl. No. 17/335,034, mailed Mar. 31, 2023.
The first office action received in the corresponding Chinese Application 201910580127.8, mailed Mar. 19, 2021.
The second office action received in the corresponding Chinese Application 201910580127.8, mailed Jun. 16, 2021.
The international search report received in the corresponding International Application PCT/CN2019/125061, mailed Mar. 12, 2020.
The written opinion of ISA received in the corresponding International Application PCT/CN2019/125061, mailed Mar. 12, 2020.
The first office action received in the corresponding Chinese Application 201910299179.8, mailed Sep. 2, 2020.
The second office action received in the corresponding Chinese Application 201910299179.8, mailed Dec. 9, 2020.
The international search report received in the corresponding International Application PCT/CN2019/129352, mailed Mar. 27, 2020.
The written opinion of ISA received in the corresponding International Application PCT/CN2019/129352, mailed Mar. 27, 2020.
The international search report received in the corresponding International Application PCT/CN2019/129354, mailed Mar. 26, 2020.
The written opinion of ISA received in the corresponding International Application PCT/CN2019/129354, mailed Mar. 26, 2020.
The first office action received in the corresponding Chinese Application 201910299937.6, mailed Sep. 1, 2020.
The extended European search report received in the corresponding European Application 19924802.2, mailed Apr. 26, 2022.
The first office action received in the corresponding European Application 19906208.4, mailed Mar. 6, 2023.
The first office action received in the corresponding Chinese Application 201910299473.9, mailed Aug. 18, 2020.
The notice of allowance received in the corresponding Chinese Application 201910299473.9, mailed Oct. 18, 2021.
The extended European search report received in the corresponding European Application 19925225.5, mailed Mar. 22, 2022.
The non-final office action received in the corresponding U.S. Appl. No. 17/501,905, mailed Sep. 14, 2023.
The international search report received in the corresponding International Application PCT/CN2019/129357, mailed Jan. 23, 2020.
The written opinion of ISA received in the corresponding International Application PCT/CN2019/129357, mailed Jan. 23, 2020.
The international search report received in the corresponding International Application PCT/CN2019/129360, mailed Apr. 1, 2020.
The written opinion of ISA received in the corresponding International Application PCT/CN2019/129360, mailed Apr. 1, 2020.
The Non-Final Office Action received in the corresponding U.S. Appl. No. 17/501,902, mailed on May 7, 2024.
The Non-Final Office Action received in the non-counterpart U.S. Appl. No. 17/540,263, mailed on Nov. 21, 2024.

* cited by examiner

ELECTRODE PLATE, ELECTROCHEMICAL APPARATUS, BATTERY MODULE, BATTERY PACK, AND DEVICE

CROSS REFERENCE TO RELATED APPLICATIONS

This application is a continuation application of PCT Patent Application No. PCT/CN2019/119739, entitled "ELECTRODE PLATE, ELECTROCHEMICAL DEVICE, BATTERY MODULE, BATTERY PACK, AND APPARATUS" filed on Nov. 20, 2019, which claims priority to Chinese Patent Application No. 201811642323.5, filed on Dec. 29, 2018, and entitled "ELECTRODE PLATE AND ELECTROCHEMICAL APPARATUS", all of which are incorporated herein by reference in their entirety.

TECHNICAL FIELD

This application relates to the battery field, and specifically, to an electrode plate, an electrochemical apparatus, a battery module, a battery pack, and a device.

BACKGROUND

Lithium-ion batteries are widely applied to electromobiles and consumer electronic products due to their advantages such as a high energy density, high output power, a long cycle life, and low environmental pollution. With the continuous expansion of the application scope of lithium-ion batteries, the requirements for the weight energy density and volumetric energy density of lithium-ion batteries are getting higher and higher.

In order to obtain a lithium-ion battery with higher quality energy density and volumetric energy density, the following improvements are usually made to lithium-ion batteries: (1) select a positive electrode material or a negative electrode material with a high specific discharge capacity; (2) optimize the mechanical design of the lithium-ion battery to minimize its volume; (3) select a positive electrode plate or a negative electrode plate with a high compaction density; (4) reduce the weight of components of the lithium-ion battery.

The improvement to a current collector is usually to select a lighter or thinner current collector. For example, a perforated current collector or a metallized plastic current collector may be used.

For the electrode plate and the battery using metallized plastic current collectors, although the energy density is increased, some performance degradation may occur in terms of processing properties, safety performance, and electrical properties. To obtain an electrode plate and a current collector with good electrochemical performance, improvements in many aspects are still required.

To overcome the deficiencies of the prior art, the present application has been proposed.

SUMMARY

In view of the above, the present application provides an electrode plate, an electrochemical apparatus, a battery module, a battery pack, and a device.

According to a first aspect, the present application provides an electrode plate, including a current collector and an electrode active material layer disposed on at least one surface of the current collector, wherein the current collector includes a support layer and a conductive layer disposed on at least one surface of the support layer, a single-sided thickness D2 of the conductive layer satisfies: 30 nm≤D2≤3 µm; and a conductive primer layer containing a conductive material and a binder is further disposed between the current collector and the electrode active material layer, the binder in the conductive primer layer containing an acrylic based/acrylate based water-dispersible binder.

According to a second aspect, the present application provides an electrochemical apparatus, including a positive electrode plate, a negative electrode plate, a separator, and an electrolyte. The positive electrode plate and/or the negative electrode plate is the electrode plate in the first aspect of the present application.

According to a third aspect, this application provides a battery module, including the electrochemical apparatus in the second aspect of this application.

According to a fourth aspect, this application provides a battery pack, including the battery module in the third aspect of this application.

According to a fifth aspect, this application provides a device, including the electrochemical apparatus in the second aspect of this application, the electrochemical apparatus used as a power supply for the device.

In some embodiments, the device includes a mobile device, an electric vehicle, an electric train, a satellite, a ship, and an energy storage system.

The technical solution of the present application has at least the following beneficial effects:

The conductive primer layer improves the composite current collector interface, increases the adhesive force between the current collector and the active material, and ensures that the electrode active material layer is more firmly disposed on the surface of the composite current collector. In addition, the shortcomings such as poor conductivity of the composite current collector and the conductive layer in the composite current collector susceptible to damage could be overcome. By effectively mending and constructing a conductive network among the current collector, the conductive primer layer and the active material, the electron transfer efficiency is improved, and the resistance between the current collector and the electrode active material layer is reduced, thereby effectively reducing the internal DC resistance in the battery core, improving the power performance of the battery core, and ensuring that the battery core is not prone to phenomena of a relatively large polarization and lithium plating during long-term cycling, that is, effectively improving the long-term reliability of the battery core. Therefore, the electrode plate and the electrochemical apparatus of the present application have good and balanced electrical properties, safety performance, and processing properties.

The battery module, the battery pack, and the device in this application include the electrochemical apparatus, and therefore have at least the same advantages as the electrochemical apparatus.

BRIEF DESCRIPTION OF DRAWINGS

The following describes in detail a positive electrode plate and an electrochemical apparatus of the present application and their beneficial effects with reference to accompanying drawings and specific implementations.

Figure 1:
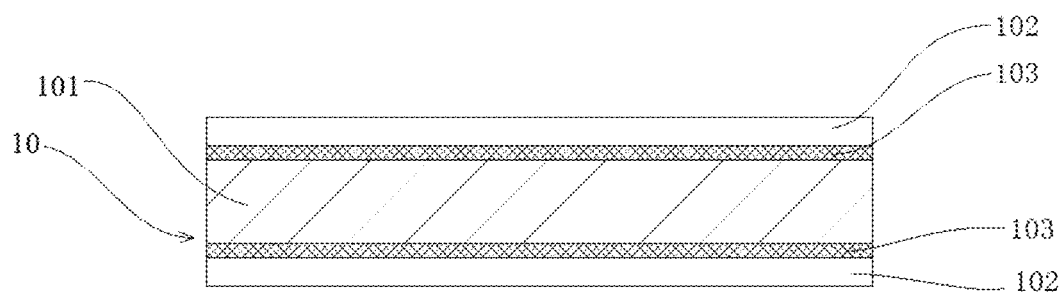
FIG. 1 is a schematic structural diagram of a positive current collector according to a specific implementation of the present application.

In the drawings:
PP—Positive electrode plate;
  10—Positive current collector;
    101—Positive electrode support layer;
    102—Positive conductive layer;
    103—Positive electrode protective layer;
  11—Conductive primer layer;
  12—Positive electrode active material layer;
NP—Negative electrode plate;
  20—Negative current collector;
    201—Negative electrode support layer;
    202—Negative conductive layer;
    203—Negative electrode protective layer;
  21—Conductive primer layer;
  22—Negative electrode active material layer;

1. Battery pack;
2. Upper case;
3. Lower case;
4. Battery module; and
5. Electrochemical apparatus.

DESCRIPTION OF EMBODIMENTS

The following further describes the present application with reference to specific implementations. It should be understood that these specific implementations are merely intended to illustrate the present application but not to limit the scope of the present application.

A first aspect of the present application relates to an electrode plate, including a current collector and an electrode active material layer disposed on at least one surface of the current collector, where the current collector includes a support layer and a conductive layer disposed on at least one surface of the support layer, a single-sided thickness $D2$ of the conductive layer satisfies: 30 nm≤$D2$≤3 µm; and a conductive primer layer containing a conductive material and a binder is further disposed between the current collector and the electrode active material layer, the binder in the conductive primer layer containing an acrylic based/acrylate based water-dispersible binder.

Obviously, the electrode plate may be a positive electrode plate or a negative electrode plate. When the electrode plate is a positive electrode plate, correspondingly, the current collector and the electrode active material layer therein are a positive current collector and a positive electrode active material layer, respectively. When the electrode plate is a negative electrode plate, correspondingly, the current collector and the electrode active material layer therein are a negative current collector and a negative electrode active material layer, respectively.

The current collector used for the electrode plate of the first aspect of the present application is a composite current collector, which is a composite of at least two materials. Structurally, the current collector includes a support layer and a conductive layer disposed on at least one surface of the support layer, and a single-sided thickness $D2$ of the conductive layer satisfies: 30 nm≤$D2$≤3 µm. Therefore, it is the conductive layer in the current collector that plays a role of conducting electricity. The thickness $D2$ of the conductive layer is much smaller than a thickness of metal current collectors such as Al foil or Cu foil commonly used in the prior art (the thickness of commonly used Al foil and Cu foil metal current collectors is usually 12 µm and 8 µm), so a mass energy density and a volumetric energy density of the electrochemical apparatus (such as the lithium battery) using the electrode plate can be increased. In addition, when the composite current collector is used as the positive current collector, the nail penetration safety performance of the positive electrode plate can also be greatly improved.

However, due to a relatively thin conductive layer of this composite current collector, compared to the traditional metal current collector (Al foil or Cu foil), the composite current collector has poorer conductivity, and the conductive layer is prone to damage in the electrode plate processing process, further affecting the electrical properties of the electrochemical apparatus. In addition, the support layer (polymer material or polymer composite material) of the composite current collector has a greater degree of rebound than traditional metal current collectors during electrode plate rolling and other processes, so both the bonding force between the support layer and the conductive layer and the binding force between the composite current collector and the electrode active material layer preferably need to be enhanced by improving the interface. In the electrode plate according to the present application, a conductive primer layer is additionally disposed between the current collector and the electrode active material layer. Specifically, the conductive primer layer is disposed between the conductive layer of the current collector and the electrode active material layer. Therefore, the conductive primer layer could improve the interface between the composite current collector and the electrode active material layer, increase the bonding force between the current collector and the electrode active material layer, and ensure that the electrode active material layer is more firmly disposed on the surface of the composite current collector. In addition, the conductive primer layer could overcome the shortcomings of poor conductivity of the composite current collector and the conductive layer in the composite current collector susceptible to damage. By effectively mending and constructing a conductive network among the current collector, the conductive primer layer and the active material, the conductive primer layer improves the electron transfer efficiency, and reduces the resistance of the electrode plate containing the composite current collector, thereby effectively reducing the internal DC resistance (DCR) in the battery core, improving the power performance of the battery core, and ensuring that the battery core is not prone to phenomena of a relatively large polarization and lithium plating during long-term cycling, that is, effectively improving the long-term reliability of the battery core.

The following describes in detail the structure, materials and performance of the electrode plate (and the current collector therein) in the implementations of the present application.

[Conductive Layer of Current Collector]

Compared to the traditional metal current collectors, in the current collector according to implementations of the present application, the conductive layer fulfills the functions of conducting and current collecting, and is used to provide electrons to the electrode active material layer.

The material of the conductive layer is selected from at least one of a metal conductive material and a carbon-based conductive material.

The metal conductive material is preferably selected from at least one of aluminum, copper, nickel, titanium, silver, nickel-copper alloy, and aluminum-zirconium alloy.

The carbon-based conductive material is preferably selected from at least one of graphite, acetylene black, graphene, and carbon nanotube.

The material of the conductive layer is preferably a metal conductive material, that is, the conductive layer is preferably a metal conductive layer. When the current collector is a positive current collector, aluminum is usually used as the material of the conductive layer; when the current collector is a negative current collector, copper is usually used as the material of the conductive layer.

When the conductive layer is poor in conductivity or too thin in thickness, the internal resistance and polarization of the battery may be large; when the conductive layer is too thick, it cannot achieve an effect of improving a weight energy density and a volumetric energy density of the battery.

The single-sided thickness of the conductive layer is $D2$. $D2$ preferably satisfies: 30 nm≤$D2$≤3 μm, more preferably 300 nm≤$D2$≤2 μm, and most preferably 500 nm≤$D2$≤1.5 μm, to better ensure a lightweight performance and a good electrical conductivity of the current collector.

In a preferred implementation of the present application, an upper limit of the single-sided thickness $D2$ of the conductive layer may be 3 μm, 2.5 μm, 2 μm, 1.8 μm, 1.5 μm, 1.2 μm, 1 μm, and 900 nm, and a lower limit of the single-sided thickness $D2$ of the conductive layer may be 800 nm, 700 nm, 600 nm, 500 nm, 450 nm, 400 nm, 350 nm, 300 nm, 100 nm, 50 nm, and 30 nm. The range of the single-sided thickness $D2$ of the conductive layer may be composed of any values of the upper limit or the lower limit. In some embodiments, 300 nm≤$D2$≤2 μm; more specifically, 500 nm≤$D2$≤1.5 μm.

Due to the small thickness of the conductive layer in the present application, cracks and other damages are likely to occur during the production of the electrode plate. At this time, the conductive primer layer is introduced into the electrode plate to buffer and protect the conductive layer, and a "repair layer" may be formed on the surface of the conductive layer to improve the bonding force and contact resistance between the current collector and the active material layer.

Generally, cracks exist in the conductive layer of the electrode plate described in this application. The cracks in the conductive layer usually exist irregularly in the conductive layer. They may be elongated cracks, cross-shaped cracks, divergent cracks, and the like, or they may be cracks that penetrate the entire conductive layer, or may be formed on the surface of the conductive layer. Cracks in the conductive layer are usually caused by the rolling during the electrode plate processing, the excessive amplitude of a welding tab, and the excessive reeling tension of a substrate.

The conductive layer may be formed on the support layer by at least one of mechanical rolling, bonding, vapor deposition (vapor deposition), and electroless plating (Electroless plating). The vapor deposition method is preferably physical vapor deposition (Physical Vapor Deposition, PVD). The physical vapor deposition method is preferably at least one of an evaporation method and a sputtering method. The evaporation method is preferably at least one of vacuum evaporation, thermal evaporation deposition, and electron beam evaporation. The sputtering method is preferably magnetron sputtering.

At least one of vapor deposition or electroless plating is preferred to enable a tighter bonding between the support layer and the conductive layer.

[Support Layer of Current Collector]

In the current collector according to implementations of the present application, the support layer fulfills the functions of supporting and protecting the conductive layer. Since the support layer generally uses an organic polymer material, a density of the support layer is usually lower than a density of the conductive layer, which can significantly increase the weight energy density of the battery compared to traditional metal current collectors.

In addition, the metal layer has a smaller thickness, which can further increase the weight energy density of the battery. In addition, since the support layer can well support and protect the conductive layer on its surface, it is not easy to produce a common fracture phenomenon of electrode plate as in traditional current collectors.

The material of the support layer is selected from at least one of an insulating polymer material, an insulating polymer composite material, a conductive polymer material, and a conductive polymer composite material.

The insulating polymer material is, for example, selected from at least one of polyamide, polyterephthalate, polyimide, polyethylene, polypropylene, polystyrene, polyvinyl chloride, aramid, polyphenylene diamide, acrylonitrile-butadiene-styrene copolymer, polybutylene terephthalate, polyparaphenylene terephthalamide, polypropylene, polyoxymethylene, epoxy resin, phenol-formaldehyde resin, polytetrafluoroethylene, polyphenylene sulfide, polyvinylidene fluoride, silicone rubber, polycarbonate, cellulose and its derivatives, starch and its derivatives, protein and its derivatives, polyvinyl alcohol and its cross-linked products, and polyethylene glycol and its cross-linked products.

The insulating polymer composite material is, for example, selected from a composite material formed of an insulating polymer material and an inorganic material, where the inorganic material is preferably at least one of a ceramic material, a glass material, and a ceramic composite material.

The conductive polymer material is, for example, selected from a polysulfur nitride polymer material or a doped conjugated polymer material, such as at least one of polypyrrole, polyacetylene, polyaniline, and polythiophene.

The conductive polymer composite material is, for example, selected from a composite material formed of an insulating polymer material and a conductive material, where the conductive material is selected from at least one of a conductive carbon material, a metal material, and a composite conductive material, the conductive carbon material is selected from at least one of carbon black, carbon nanotube, graphite, acetylene black, and graphene, the metal material is selected from at least one of nickel, iron, copper, aluminum or alloy of the foregoing metals, and the composite conductive material is selected from at least one of nickel-coated graphite powder and nickel-coated carbon fiber.

Those skilled in the art can reasonably select and determine the material of the support layer based on the actual needs of the application environment, costs and other factors. The material of the support layer in the present application is preferably an insulating polymer material or an insulating polymer composite material, especially when the current collector is a positive current collector.

When the current collector is a positive current collector, the safety performance of the battery can be significantly improved by using a special current collector supported by an insulating layer and having a conductive layer with a specific thickness. Since the insulating layer is non-conductive, its resistance is relatively large, which can increase the short-circuit resistance when the battery is short-circuited under abnormal conditions, and greatly reduce the short-circuit current. Therefore, the heat generated by the short circuit can be greatly reduced, thereby improving the safety performance of the battery. In addition, the conductive layer is relatively thin, so that under exceptions such as nail penetration, the local conductive network is cut off, preventing a large area of the electrochemical apparatus or even the entire electrochemical apparatus from being short-circuited. This can limit the damage of the electrochemical apparatus caused by nail penetration to a puncture site, only forming a "point disconnection" without affecting the normal operation of the electrochemical apparatus within a period of time.

The thickness of the support layer is D1, and D1 preferably satisfies: 1 $\mu m \leq D1 \leq 30$ $\mu m$ and more preferably 1 $\mu m \leq D1 \leq 15$ $\mu m$.

If the support layer is too thin, the mechanical strength of the support layer is insufficient, and breakage easily occurs during the process such as the electrode plate processing process; if the support layer is too thick, the volumetric energy density of the battery using the current collector will be reduced.

The upper limit of the thickness D1 of the support layer may be 30 $\mu m$, 25 $\mu m$, 20 $\mu m$, 15 $\mu m$, 12 $\mu m$, 10 $\mu m$, and 8 $\mu m$, and a lower limit may be 1 $\mu m$, 1.5 $\mu m$, 2 $\mu m$, 3 $\mu m$, 4 $\mu m$, 5 $\mu m$, 6 $\mu m$, and 7 $\mu m$; and the range of the thickness D1 of the support layer may be composed of any numbers of the upper or lower limit. In some embodiments, 1 $\mu m \leq D1 \leq 15$ $\mu m$, more preferably 2 $\mu m \leq D1 \leq 10$ $\mu m$, and most preferably 3 $\mu m \leq D1 \leq 8$ $\mu m$.

At the same time, the specific thickness in the present application can further ensure that the current collector has a relatively large resistance, and significantly reduce the battery heating up when an internal short circuit occurs. When the conductive layer is aluminum, it can also significantly reduce or prevent the aluminumthermic reaction of the positive current collector, ensuring that the battery has good safety performance.

In addition, when the conductive layer is a metal conductive layer, the room temperature Young's modulus of the support layer preferably satisfies: 20 GPa$\geq$E$\geq$4 GPa.

The test method of the room temperature Young's modulus of the support layer described in the present application is as follows:

Take a support layer sample and cut it into 15 mm×200 mm, measure the thickness h ($\mu m$) of the sample with a micrometer. Use a Gotech tensile machine under room temperature and pressure to carry out a tensile test, set an initial position, and make the sample between clamps 50 mm long. Stretching is carried out at a speed of 50 mm/min. Record the load L(N) and the displacement y (mm) of the equipment when the sample is stretched to break, then the stress $\varepsilon = L/(15*h)*1000$, and the strain $\eta = y/50*100$. Draw a stress-strain curve, and take the curve in the initial linear region, where the slope of this curve is the Young's modulus E.

Since metal is more rigid than polymer or polymer composite materials, that is, the deformation is small during the rolling process of the electrode plate processing, in order to ensure that a deformation difference between the support layer and the conductive layer is not too large to tear the conductive layer, the room temperature Young's modulus of the support layer should preferably satisfy: 20 GPa$\geq$E$\geq$4 GPa, so that the support layer can have a rigidity, and the rigidity matching between the support layer and the conductive layer can be further improved. This ensures that the difference in the deformations of the supporting layer and the conductive layer will not be too large during the processing of the current collector and the electrode plate.

Since the support layer has a rigidity (20 GPa$\geq$E$\geq$4 GPa), the current collector is not easy to deform or stretch too much during the processing of the current collector and the electrode plate, so that the support layer and the conductive layer can be firmly bonded, not easy to detach, and can prevent damage to the conductive layer caused by the conductive layer being "forced" to stretch. In addition, the current collector according to the present application has a toughness, so that the current collector and the electrode plates have an ability to withstand deformation and are not easy to break.

However, the Young's modulus of the support layer cannot be too large; otherwise, the rigidity is too strong, which will cause reeling and winding difficulties, and poor quality. When 20 GPa$\geq$E, the support layer can be guaranteed to have a flexibility, and the electrode plates can also have an ability to withstand deformation.

In addition, the heat shrinkage rate of the support layer at 90° C. is preferably not more than 1.5%, to better ensure the thermal stability of the current collector during the processing of the electrode plate.

[Protective Layer of Current Collector]

In some preferred implementations of the present application, the current collector is further provided with a protective layer, and the protective layer is disposed on one surface of the conductive layer of the current collector or on two surfaces of the conductive layer of the current collector, that is, on the surface of the conductive layer away from the support layer and on the surface facing the support layer.

The protective layer may be a metal protective layer or a metal oxide protective layer. The protective layer can prevent the conductive layer of the current collector from being damaged by chemical corrosion or mechanical damage, and can also enhance the mechanical strength of the current collector.

In some embodiments, the protective layer is disposed on both surfaces of the conductive layer of the current collector. The lower protective layer of the conductive layer (that is, the protective layer disposed on the surface of the conductive layer facing the support layer) can not only prevent damage to the conductive layer and enhance the mechanical strength of the current collector, but also enhance the bonding force between the support layer and the conductive layer to prevent peeling (that is, the separation of the support layer from the conductive layer).

The technical effect of the upper protective layer of the conductive layer (that is, the protective layer disposed on the surface of the conductive layer away from the support layer) is mainly to prevent the conductive layer from being damaged and corroded during processing (for example, electrolyte immersion and rolling may affect the surfaces of the conductive layer). In the electrode plate of the present application, a conductive primer layer is used to repair the cracks that may occur in the conductive layer during the processes such as rolling and winding, enhance the conductivity, and make up for the composite current collector as the current collector. Therefore, the upper protective layer of the conductive layer can cooperate with the conductive primer layer to further provide protection for the conductive layer, thereby jointly improving the conductive effect of the composite current collector as the current collector.

Due to the good conductivity, the metal protective layer can not only further improve the mechanical strength and corrosion resistance of the conductive layer, but also reduce the polarization of the electrode plate. The material of the metal protective layer is, for example, selected from at least one of nickel, chromium, nickel-based alloy, and copper-based alloy, preferably nickel or nickel-based alloy.

The nickel-based alloy is an alloy formed by adding one or more other elements to pure nickel as the matrix. In some embodiments, it is a nickel-chromium alloy. The nickel-chromium alloy is an alloy formed of metallic nickel and metallic chromium. In some embodiments, the molar ratio of nickel to chromium is 1:99 to 99:1.

Copper-based alloy is an alloy formed by adding one or more other elements to pure copper as the matrix. In some embodiments, it is a copper-nickel alloy. In some embodiments, in the copper-nickel alloy, the molar ratio of nickel to copper is 1:99 to 99:1.

When a metal oxide is selected for the protective layer, due to its low ductility, large specific surface area, and high hardness, it can also form effective support and protection for the conductive layer, and have a good technical effect on improving the bonding force between the support layer and the conductive layer. The material of the metal oxide protective layer is, for example, selected from at least one of aluminum oxide, cobalt oxide, chromium oxide, and nickel oxide.

When the current collector is used as a positive current collector, the protective layer of the composite current collector according to the present application preferably adopts a metal oxide to achieve good support and protection technical effects while further improving the safety performance of the positive electrode plate and the battery. When the current collector is used as a negative current collector, the protective layer of the composite current collector according to the present application preferably adopts metal to achieve good support and protection technical effects while further improving the conductivity of the electrode plate and the dynamic performance of the battery to reduce battery polarization.

The thickness of the protective layer is D3, and D3 preferably satisfies: $D3 \leq \frac{1}{10} D2$, and $1\ nm \leq D3 \leq 200\ nm$. If the protective layer is too thin, it is not enough to protect the conductive layer; if the protective layer is too thick, the weight energy density and the volumetric energy density of the battery will be reduced. More preferably, $5\ nm \leq D3 \leq 500\ nm$, further preferably $10\ nm \leq D3 \leq 200\ nm$, most preferably $10\ nm \leq D3 \leq 50\ nm$.

The materials of the protective layers on the two surfaces of the conductive layer may be the same or different, and the thickness may be the same or different.

In some embodiments, the thickness of the lower protective layer is smaller than the thickness of the upper protective layer to help improve the weight energy density of the battery.

Further optionally, the ratio of the thickness D3" of the lower protective layer to the thickness D3' of the upper protective layer is: $\frac{1}{2} D3' \leq D3'' \leq \frac{4}{5} D3'$.

When the current collector is a positive current collector, aluminum is usually used as the material of the conductive layer, and a metal oxide material is preferably selected for the lower protective layer. Compared with the choice of metal used for the lower protective layer, the metal oxide material has a larger resistance. Therefore, this type of lower protective layer can further increase the resistance of the positive current collector to some extent, thereby further increasing the short circuit resistance of the battery in the event of a short circuit under abnormal conditions, and improving the safety performance of the battery. In addition, because the specific surface area of the metal oxide is larger, the bonding force between the lower protective layer of the metal oxide material and the support layer is enhanced. Moreover, because the specific surface area of the metal oxide is larger, the lower protective layer can increase the roughness of the support layer surface, and enhance the bonding force between the conductive layer and the supporting layer, thereby increasing the overall strength of the current collector.

When the current collector is a negative current collector, copper is usually used as the material of the conductive layer, and a metal material is preferably selected for the protective layer. More preferably, on the basis of including at least one metal protective layer, at least one of the upper protective layer and the lower protective layer further includes a metal oxide protective layer, to simultaneously improve the conductivity and interface bonding force of the negative electrode composite current collector.

[Current Collector]

FIG. 1 to FIG. 8 show schematic structural diagrams of a current collector used in an electrode plate according to some implementations of the present application.

The schematic diagrams of a positive current collector are shown in FIG. 1 to FIG. 4.

In FIG. 1, the positive current collector 10 includes a support layer 101 of the positive current collector and conductive layers 102 of the positive current collector disposed on two opposite surfaces of the support layer 101 of the positive current collector, and further includes protective layers 103 of the positive current collector disposed on lower surfaces of the conductive layers 102 of the positive current collector (that is, the surfaces facing the support layer 101 of the positive current collector), that is, lower protective layers.

Figure 2:
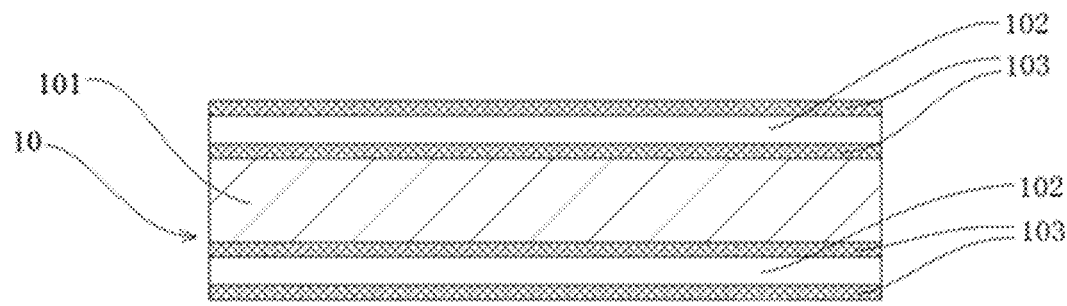
FIG. 2 is a schematic structural diagram of a positive current collector according to another specific implementation of the present application.

In FIG. 2, the positive current collector 10 includes a support layer 101 of the positive current collector and conductive layers 102 of the positive current collector disposed on two opposite surfaces of the support layer 101 of the positive current collector, and further includes protective layers 103 of the positive current collector disposed on two opposite surfaces of the conductive layer 102 of the positive current collector, that is, a lower protective layer and an upper protective layer.

Figure 3:
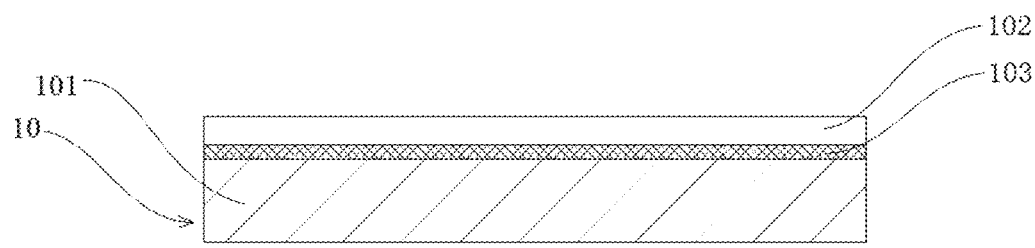
FIG. 3 is a schematic structural diagram of a positive current collector according to another specific implementation of the present application.

In FIG. 3, the positive current collector 10 includes a support layer 101 of the positive current collector and a conductive layer 102 of the positive current collector disposed on one surface of the support layer 101 of the positive current collector, and further includes a protective layer 103 of the positive current collector disposed on a surface of the conductive layer 102 of the positive current collector facing the support layer 101 of the positive current collector, that is, a lower protective layer.

Figure 4:
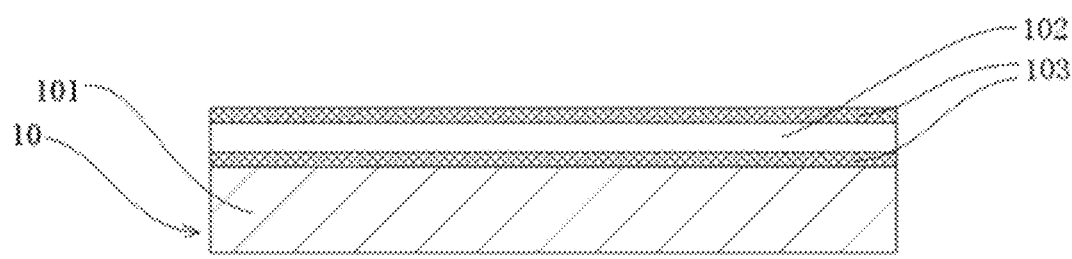
FIG. 4 is a schematic structural diagram of a positive current collector according to another specific implementation of the present application.

In FIG. 4, the positive current collector 10 includes a support layer 101 of the positive current collector and a conductive layer 102 of the positive current collector disposed on one surface of the support layer 101 of the positive current collector, and further includes protective layers 103 of the positive current collector disposed on two opposite surfaces of the conductive layer 102 of the positive current collector, that is, a lower protective layer and an upper protective layer.

Similarly, the schematic diagrams of a negative current collector are shown in FIG. 5 to FIG. 8.

Figure 5:
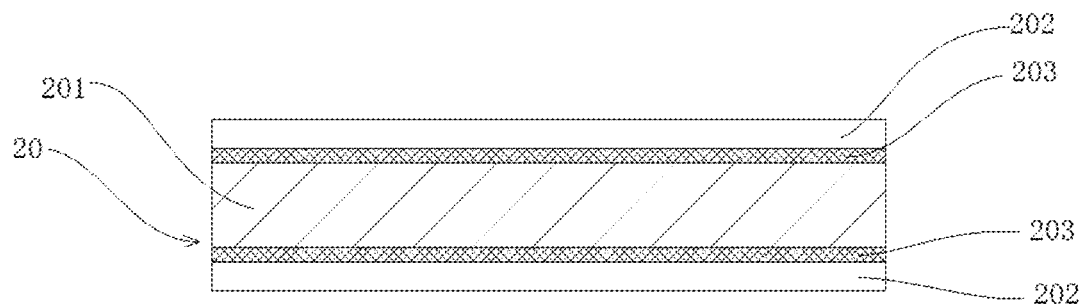
FIG. 5 is a schematic structural diagram of a negative current collector according to a specific implementation of the present application.

In FIG. 5, the negative current collector 20 includes a support layer 201 of the negative current collector and conductive layers 202 of the negative current collector disposed on two opposite surfaces of the support layer 201 of the negative current collector, and further includes protective layers 203 of the negative current collector disposed on surfaces of the conductive layers 202 of the negative current collector facing the support layer 201 of the negative current collector, that is, lower protective layers.

Figure 6:
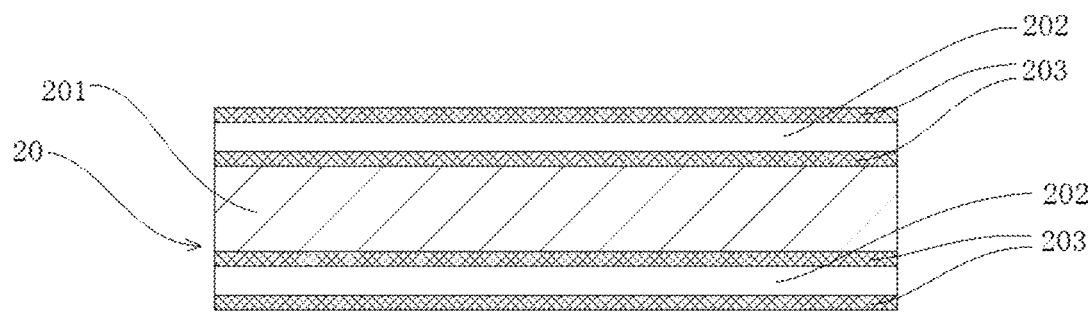
FIG. 6 is a schematic structural diagram of a negative current collector according to another specific implementation of the present application.

In FIG. 6, the negative current collector 20 includes a support layer 201 of the negative current collector and conductive layers 202 of the negative current collector disposed on two opposite surfaces of the support layer 201 of the negative current collector, and further includes protective layers 203 of the negative current collector disposed on two opposite surfaces of the conductive layer 202 of the negative current collector, that is, a lower protective layer and an upper protective layer.

Figure 7:
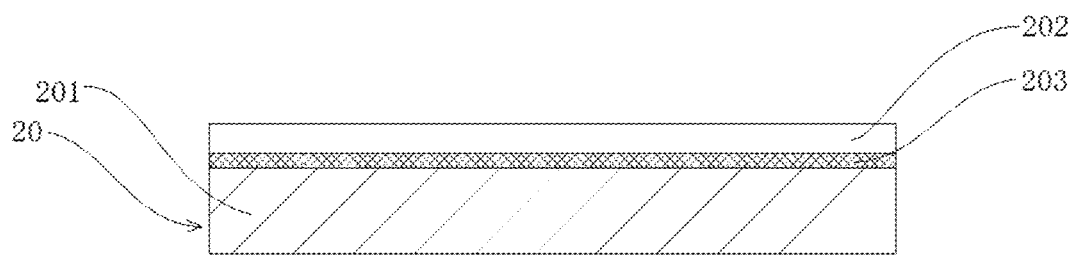
FIG. 7 is a schematic structural diagram of a negative current collector according to another specific implementation of the present application.

In FIG. 7, the negative current collector 20 includes a support layer 201 of the negative current collector and a conductive layer 202 of the negative current collector disposed on one surface of the support layer 201 of the negative current collector, and further includes a protective layer 203 of the negative current collector disposed on the conductive layer 202 of the negative current collector facing the support layer 203 of the negative current collector, that is, a lower protective layer.

Figure 8:
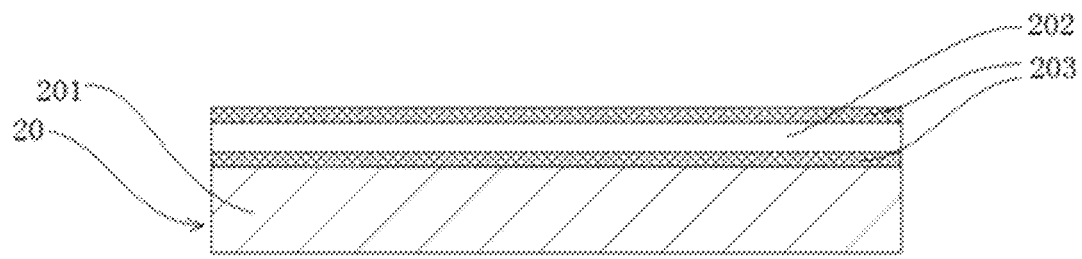
FIG. 8 is a schematic structural diagram of a negative current collector according to another specific implementation of the present application.

In FIG. 8, the negative current collector 20 includes a support layer 201 of the negative current collector and a conductive layer 202 of the negative current collector disposed on one surface of the support layer 201 of the negative current collector, and further includes protective layers 203 of the negative current collector disposed on two opposite surfaces of the conductive layer 202 of the negative current collector, that is, a lower protective layer and an upper protective layer.

The materials of the protective layers on the two opposite surfaces of the conductive layer may be the same or different, and the thickness may be the same or different.

For the current collector used for the electrode plate according to the present application, as shown in FIG. 1, FIG. 2, FIG. 5, and FIG. 6, a conductive layer may be disposed on each of the two opposite surfaces of the support layer, or as shown in FIG. 3, FIG. 4, FIG. 7, and FIG. 8, a conductive layer may be disposed on only one surface of the support layer.

In addition, although the composite current collector used in the electrode plates of the present application preferably contains a protective layer of the current collector as shown in FIGS. 1 to 8, it should be understood that the protective layer of the current collector is not a necessary structure of the current collector. The current collector used in some implementations may not contain a protective layer of the current collector.

[Conductive Primer Layer of Electrode Plate]

The conductive primer layer contains a conductive material and a binder.

Based on a total weight of the conductive primer layer, the percentage of a conductive material by weight is 10% to 99%, preferably 20% to 80%, and more preferably 50% to 80%; the percentage of the binder by weight is 1% to 90%, preferably 20% to 80%, and more preferably 20% to 50%. The percentages can help to improve the conductivity of the electrode plate and the bonding force between the current collector and the electrode active material layer.

The conductive material is at least one of a conductive carbon material and a metal material.

The conductive carbon material is selected from at least one of zero-dimensional conductive carbon (such as acetylene black or conductive carbon black), one-dimensional conductive carbon (such as carbon nanotube), two-dimensional conductive carbon (such as conductive graphite or graphene), and three-dimensional conductive carbon (such as reduced graphene oxide). The metal material is selected from at least one of aluminum powder, iron powder and silver powder.

A preferred conductive material contains a one-dimensional conductive carbon material and/or a two-dimensional conductive carbon material.

A preferred conductive material contains a one-dimensional conductive material. Due to the special morphology of the one-dimensional conductive material, the conductivity of the conductive primer layer can be improved. Especially when an amount of the conductive material is added, compared with other types of conductive materials, the one-dimensional conductive material can better improve the conductivity of the conductive primer layer. Carbon nanotubes are preferred, and their length-diameter ratio is preferably 1000 to 5000.

A preferred conductive material contains a two-dimensional conductive carbon material. After the two-dimensional conductive carbon material is added, the two-dimensional conductive carbon material in the conductive primer layer can produce "horizontal sliding" during the compacting process of the electrode plate, achieving a function of buffering, reducing the damage to the conductive layer of the current collector during the compacting process, and reducing cracks. A preferred two-dimensional conductive carbon material is flake conductive graphite with a particle diameter D50 of 0.01 μm to 0.1 μm.

In some embodiments, the one-dimensional conductive material and/or the two-dimensional conductive material is 1 wt % to 50 wt % in the conductive material.

In a preferred implementation, the conductive material is a combination of a one-dimensional conductive carbon material and a zero-dimensional conductive carbon material. One-dimensional carbon (such as carbon nanotube) and zero-dimensional carbon (such as spherical acetylene black) may be mixed to form a uniform conductive network by combining the points and lines, effectively enhancing the conductivity of the conductive primer layer. The effect of only acetylene black or carbon nanotube is not as good as that of the conductive carbon combining the both.

In another preferred implementation, the conductive material is a combination of a two-dimensional conductive carbon material and a zero-dimensional conductive carbon material. Two-dimensional carbon (such as flake conductive graphite or graphene) and zero-dimensional carbon (such as spherical acetylene black) may be mixed to form a uniform conductive network by combining the points and planes, effectively enhancing the conductivity of the conductive primer layer. Moreover, the two-dimensional carbon material can fulfill the function of "buffering".

In still another preferred implementation, the conductive material is a combination of a one-dimensional conductive carbon material, a two-dimensional conductive material and a zero-dimensional conductive carbon material. One-dimensional carbon (such as carbon nanotube), two-dimensional carbon (such as flake conductive graphite or graphene) and zero-dimensional carbon (such as spherical acetylene black) may be mixed to form a uniform conductive network by combining points, lines, and planes, effectively enhancing the conductivity of the conductive primer layer. Moreover, the two-dimensional carbon material can fulfill the function of "buffering".

In some embodiments, based on the total weight of the conductive materials, the conductive materials contain at least one of 5 wt % to 50 wt % of one-dimensional conductive material, two-dimensional conductive material, and 50 wt % to 95 wt % of other conductive materials (such as zero-dimensional conductive carbon or metal material, preferably zero-dimensional conductive carbon).

The binder in the conductive primer layer may be various binders commonly used in the art, for example, may be selected from at least one of styrene butadiene rubber, oil-dispersible polyvinylidene fluoride (PVDF), polyvinylidene fluoride copolymer (such as PVDF-HFP copolymer or PVDF-TFE copolymer), sodium carboxymethyl cellulose, polystyrene, polyacrylic acid, polytetrafluoroethylene, polyacrylonitrile, polyimide, water-dispensible PVDF, polyurethane, polyvinyl alcohol, polyacrylate, polyacrylic acid-polyacrylonitrile copolymer, and polyacrylate-polyacrylonitrile copolymer. However, it has already been found that the used binder preferably contains a water-dispersible binder, that is, the used binder is a water-dispersible binder or a mixture of a water-dispersible binder and an oil-dispersible binder. In this way, the DCR growth of an electrochemical apparatus is small. Most preferably, the used binder contains at least acrylic based/acrylate based water-dispersible binder. Because the acrylic based/acrylate based water-dispersible binder is beneficial to get a slurry with a relatively high stability, the coating uniformity of the primer layer can be improved, further avoiding the phenomenon of lithium plating caused by uneven coating or concentration.

In the present application, a "water-dispersible" polymer material means that the polymer molecular chain is fully extended and dispersed in water, and an "oil-dispersible" polymer material means that the polymer molecular chain is fully extended and dispersed in an oil-dispersible solvent. Those skilled in the art understand that the same type of polymer materials can be dispersed in water and oil respectively by using suitable surfactants, that is, by using suitable surfactants, the same type of polymer materials can be made into water-dispersible polymer materials and oil-dispersible polymer materials. For example, those skilled in the art can modify PVDF into water-dispersible PVDF or oil-dispersible PVDF as needed. For a mixture of a water-dispersible binder and an oil-dispersible binder, the water-dispersible binder is preferably 30% to 100% of the total weight of the used binder.

In the present application, an "acrylic based/acrylate based" water-dispersible binder refers to the homopolymer or copolymer containing acryloyl groups or acrylic groups that may be used as a binder. Those skilled in the art know various acrylic based/acrylate based binders commonly used in the battery industry, and may make appropriate choice based on an actual requirement. For example, the acrylic based/acrylate based binder may include but not limited to: polyacrylic acid, polymethacrylic acid, polyacrylic acid-polyacrylonitrile copolymer, polyacrylate-polyacrylonitrile copolymer, sodium polyacrylate, sodium polymethacrylate, PAALi, lithium polymethacrylate, polyacrylamide or polymethacrylamide and its various derivatives (such as poly(N-methylolacrylamide), poly(N-acrylamide), poly(N-hydroxypropylacrylamide), poly N-(2-hydroxypropyl)-acrylamide ester, and poly N-(2-dimethylaminoethyl) acrylamide), polyacrylate or polymethacrylate (such as polymethyl acrylate, polymethyl methacrylate, polyethyl acrylate, polyethyl methacrylate, polyhydroxyethyl arylate, polyhydroxyethyl methacrylate, polyhydroxypropyl acrylate, polyhydroxypropyl methacrylate, polybutyl acrylate, polybutyl methacrylate, polydimethylaminoethyl methacrylate, polydiethylaminoethyl methacrylate, poly 2-ethoxyethyl acrylate, poly 2-isocyanatoethyl acrylate, polyethyl methacrylate, poly(n-butyl acrylate), poly(isobutyl acrylate), poly(t-butyl acrylate), poly(isooctyl acrylate), poly(-ethylhexyl acrylate), poly(lauryl acrylate), or poly(lauryl methacrylate)), polyglycidyl acrylate, polyglycidyl methacrylate, polyacrylic acid glycidyl ether, polymethacrylic acid glycidyl ether, and polyacrylate or polymethacrylate having siloxy group (such as poly γ-methylpropene acyloxy propyl trimethoxy silane). The acrylic based/acrylate based binder may also be a copolymer obtained by copolymerizing acryloyl groups or acrylic monomers and other vinyl monomers, where the acryloyl groups or acrylic monomers may be, for example, acrylic acid, methacrylic acid, acrylate or methacrylate (methyl acrylate, methyl methacrylate, ethyl acrylate, ethyl methacrylate, hydroxyethyl acrylate, hydroxyethyl methacrylate, hydroxypropyl acrylate, hydroxypropyl methacrylate, butyl acrylate, butyl methacrylate, dimethylaminoethyl methacrylate, diethylaminoethyl methacrylate, 2-ethoxyethyl acrylate, 2-isocyanatoethyl acrylate, ethyl methacrylate, n-butyl acrylate, isobutyl acrylate, t-butyl acrylate, isooctyl acrylate, 2-ethylhexyl acrylate, lauryl acrylate, lauryl methacrylate, or the like), glycidyl acrylate, acrylic acid glycidyl ether, glycidyl methacrylate, polymethacrylic acid glycidyl ether, or acrylamide (such as acrylamide, N-methylolacrylamide, N-acrylamide, N-hydroxypropylacrylamide, N-(2-hydroxypropyl)-acrylamide ester, N-(2-dimethylaminoethyl) acrylamide, diacetone-acryloamide, ethyl acetoacetate methacrylate, or N-vinylacetamide), while the other vinyl monomers are, for example, ethylene, propylene, alkenyl halide, ethenol, acetic acid ethen, vinyl siloxane, butadiene, isoprene, and styrene. As stated above, if desired, those skilled in the art may properly modify the above acrylic based/acrylate based binder to obtain the acrylic based/acrylate based water-dispersible binder suitable for use by the present application.

For the conductive primer layer of the present application, the most preferred acrylic based/acrylate based water-dispersible binder is at least one of polyacrylic acid, polyacrylate, sodium polyacrylate, lithium polyacrylate, polyacrylic acid-polyacrylonitrile copolymer, and polyacrylate-polyacrylonitrile copolymer.

The binder in the conductive primer layer may be a mixture of the acrylic based/acrylate based water-dispersible binder and another binder. The another binder may be selected from at least one of styrene butadiene rubber, oil-dispersible polyvinylidene fluoride (PVDF), polyvinylidene fluoride copolymer (such as PVDF-HFP copolymer or PVDF-TFE copolymer), sodium carboxymethyl cellulose, polystyrene, polyacrylic acid, polytetrafluoroethylene, polyacrylonitrile, polyimide, water-dispensible PVDF, polyurethane, polyvinyl alcohol, and polyacrylate. The acrylic based/acrylate based water-dispersible binder is 50 wt % to 100 wt % of the binder in the conductive primer layer. Most preferably, the binder in the conductive primer layer only contains the acrylic based/acrylate based water-dispersible binder, but does not contain any other types of binders, that is, the binder in the conductive primer layer is wholly the acrylic based/acrylate based water-dispersible binder.

The single-sided thickness H of the conductive primer layer is preferably: 0.1 to 5 μm. In some embodiments, H/D2 is 0.5:1 to 5:1. If the ratio is too small, it cannot effectively improve the cracks of the conductive layer or improve the conductivity of the electrode plates; if the ratio is too large, it will not only reduce the weight energy density of the battery, but also increase the DCR of the battery, which is not conducive to the improvement of the dynamic performance of the battery.

[Electrode Active Material Layer of Electrode Plate]

The electrode active material layer used for the electrode plate of the present application may be various conventional electrode active material layers commonly used in the art, and its constructions and preparation methods are well-known in the art. The electrode active material layer usually includes an electrode active material, a binder, and a conductive agent. The electrode active material layer may also include other optional additives or auxiliaries as needed.

For the electrode plate of the present application, the average particle size D50 of the active material in the electrode active material layer preferably is 5 to 15 μm. If D50 is too small, the porosity of the electrode plate after compaction is small, which is not conducive to the infiltration of the electrolyte, and its large specific surface area is likely to cause more side reactions with the electrolyte, reducing the reliability of the battery; if D50 is too large, it is easy to cause a great damage to the conductive primer layer and the composite current collector during the compaction process of the electrode plate. D50 refers to the particle size when the cumulative volume percentage of the active material reaches 50%, that is, the median particle size of the volume distribution. D50 may be measured by using, for example, a laser diffraction particle size distribution measuring instrument (for example, Malvern Mastersizer 3000).

Moreover, for the electrode plate of the present application, when the content of the binder in the electrode active material layer is relatively high, the bonding force between the active material layer and the conductive primer layer is strong, and then the bonding force between the entire film layer (a collective term for the active material layer and the conductive primer layer) and the composite current collector is also strong. Therefore, under exceptions such as nail penetration, the active material layer (or film layer) can efficiently wrap the metal burrs generated in the conductive layer to improve the nail penetration safety performance of the battery. Therefore, in terms of further improving the battery safety, it is preferable that based on the total weight of the electrode active material layer, the content of the binder in the electrode active material layer is not less than 1 wt %, preferably not less than 1.5 wt %. When the content of the binder is maintained at an amount, the bonding force between the active material layer and the conductive primer layer is strong, so that the active material layer can efficiently wrap the metal burrs generated in the conductive layer to improve the nail penetration safety performance of the battery.

For the positive electrode plate, various electrode active materials commonly used in the art (that is, positive electrode active materials) may be selected. For example, for lithium batteries, the positive electrode active material may be selected from lithium cobalt oxide, lithium nickel oxide, lithium manganese oxide, lithium nickel manganese oxide, lithium nickel cobalt manganese oxide, lithium nickel cobalt aluminum oxide, transition Metal phosphates, lithium iron phosphate, and the like, but the present application is not limited to these materials, and other conventionally known materials that can be used as positive active materials of lithium ion batteries can also be used. One type of these positive active materials may be used alone, or two or more types may be used in combination. In some embodiments, the positive electrode active material may be selected from one or more of LiCoO2, LiNiO2, LiMnO2, LiMn2O4, LiNi⅓Co⅓Mn⅓O2 (NCM333), LiNi0.5Co0.2Mn0.3O2 (NCM523), LiNi0.6Co0.2Mn0.2O2 (NCM622), LiNi0.8Co0.1Mn0.1O2 (NCM811), LiNi0.85Co0.15Al0.05O2, LiFePO4 (LFP), and LiMnPO4.

For the negative electrode plate, various electrode active materials commonly used in the art (that is, negative electrode active materials) may be selected. For example, for lithium batteries, the negative electrode active material may be selected from carbonaceous materials such as graphite (artificial graphite or natural graphite), conductive carbon black, and carbon fiber, metal or semi-metal materials such as Si, Sn, Ge, Bi, Sn, and In, and their alloys, lithium-containing nitrides or lithium-containing oxides, lithium metals or lithium aluminum alloys, and the like.

It is known by those skilled in the art, the needed electrode active material layer can be obtained by applying the slurry made up of an electrode active material, a conductive agent, and a binder onto the electrode current collector (or onto the primer layer of the electrode current collector in advance), and then performing post processing such as drying.

[Electrode Plate]

FIG. 9 to FIG. 12 show schematic structural diagrams of an electrode plate according to some implementations of the present application.

Figure 9:
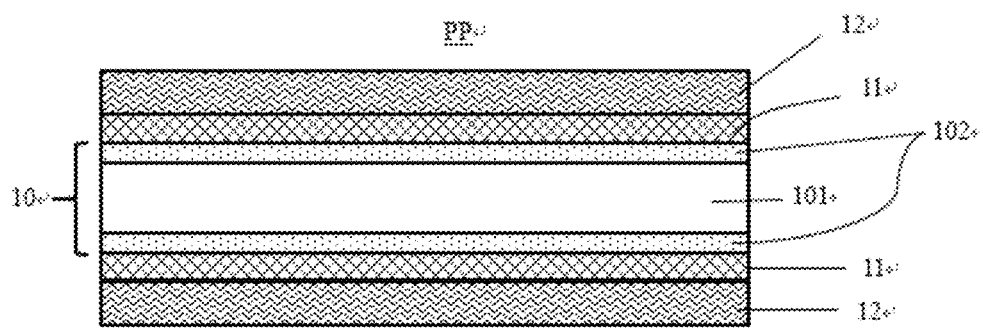
FIG. 9 is a schematic structural diagram of a positive electrode plate according to a specific implementation of the present application.
Figure 10:
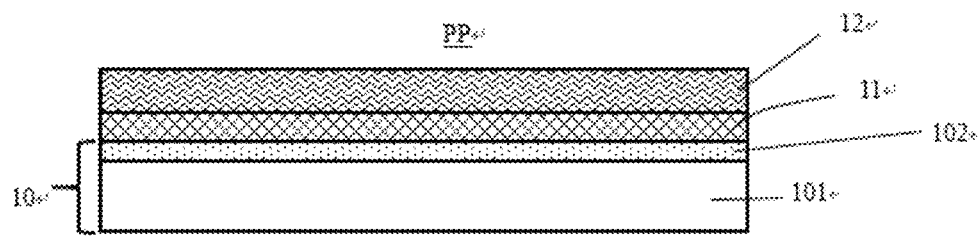
FIG. 10 is a schematic structural diagram of a positive electrode plate according to another specific implementation of the present application.

The schematic diagrams of a positive electrode plate are shown in FIG. 9 and FIG. 10.

In FIG. 9, the positive electrode plate PP includes a positive current collector 10 and conductive primer layers 11 and positive electrode active material layers 12 disposed on two opposite surfaces of the positive current collector 10. The positive current collector 10 includes a support layer 101 of the positive current collector and conductive layers 102 of the positive current collector disposed on two opposite surfaces of the support layer 101 of the positive current collector.

In FIG. 10, the positive electrode plate PP includes a positive current collector 10 and a conductive primer layer 11 and a positive electrode active material layer 12 disposed on one surface of the positive current collector 10. The positive current collector 10 includes a support layer 101 of the positive current collector and a conductive layer 102 of the positive current collector disposed on one surface of the support layer 101 of the positive current collector.

Figure 11:
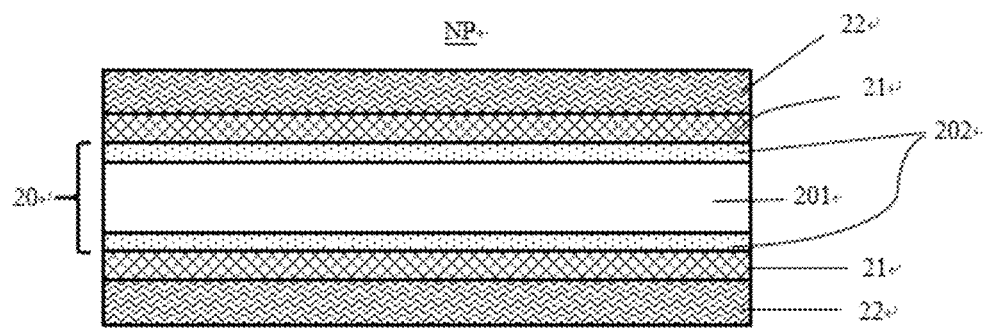
FIG. 11 is a schematic structural diagram of a negative electrode plate according to a specific implementation of the present application.
Figure 12:
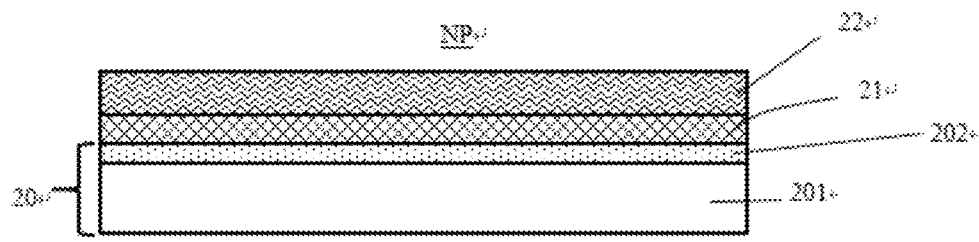
FIG. 12 is a schematic structural diagram of a negative electrode plate according to another specific implementation of the present application.

The schematic diagrams of a negative electrode plate are shown in FIG. 11 and FIG. 12.

In FIG. 11, the negative electrode plate NP includes a negative current collector 20 and conductive primer layers 21 and negative electrode active material layers 22 disposed on two opposite surfaces of the negative current collector 20. The negative current collector 20 includes a support layer 201 of the negative current collector and conductive layers 202 of the negative current collector disposed on two opposite surfaces of the support layer 201 of the negative current collector.

In FIG. 12, the negative electrode plate NP includes a negative current collector 20 and a conductive primer layer 21 and a negative electrode active material layer 22 disposed on one surface of the negative current collector 20. The negative current collector 20 includes a support layer 201 of the negative current collector and a conductive layer 202 of the negative current collector disposed on one surface of the support layer 201 of the negative current collector.

As shown in FIG. 9 to FIG. 12, the electrode active material layer may be disposed on one surface of the current collector, or may be disposed on two surfaces of the current collector.

Those skilled in the art can understand that, when a current collector provided with double-sided conductive layers is used, the electrode plates may be coated on two sides (that is, the electrode active material layer is disposed on two surfaces of the current collector), or only on one side (that is, the electrode active material layer is only disposed on one surface of the current collector); when the current collector provided with only a single-sided conductive layer is used, the electrode plates may only be coated on one side, and the electrode active material layer (and the conductive primer layer) may only be coated on the side of the current collector provided with the conductive layer.

[Electrochemical Apparatus]

According to a second aspect, the present application relates to an electrochemical apparatus, including a positive electrode plate, a negative electrode plate, a separator, and an electrolyte, where the positive electrode plate and/or the negative electrode plate is the electrode plate in the first aspect of the present application.

The electrochemical apparatus may be a capacitor, a primary battery, or a secondary battery. For example, it may be a lithium-ion capacitor, a lithium-ion primary battery, or a lithium-ion secondary battery. Except for the use of the positive electrode plate and/or the negative electrode plate of the present application, the constructions and preparation methods of these electrochemical apparatuses are well-known. Due to the use of the positive electrode plate of the present application, the electrochemical apparatus can have improved safety (such as nail penetration safety) and electrical performance. Furthermore, the positive electrode plate of the present application can be easily processed, so that the manufacturing cost of the electrochemical apparatus using the positive electrode plate of the present application can be reduced.

In the electrochemical apparatus of the present application, specific types and composition of separators and electrolytes are not specifically limited, and may be selected according to actual needs. Specifically, the separator may be selected from a polyethylene film, a polypropylene film, a polyvinylidene fluoride film, non-woven fabrics, and a multilayer composite film thereof. When the battery is a lithium-ion battery, a non-water-dispersible electrolyte is generally used as the electrolyte. As the non-water-dispersible electrolyte, a lithium salt solution dissolved in an organic solvent is generally used. The lithium salt is, for example, an inorganic lithium salt such as $LiClO_4$, $LiPF_6$, $LiBF_4$, $LiAsF_6$, or $LiSbF_6$, or an organic lithium salt such as $LiCF_3SO_3$, $LiCF_3CO_2$, $Li_2C_2F_4(SO_3)_2$, $LiN(CF_3SO_2)_2$, $LiC(CF_3SO_2)_3$, or $LiC_nF_{2n+1}SO_3$ ($n\geq 2$). The organic solvents used in the non-water-dispersible electrolyte are, for example, cyclic carbonates such as vinyl carbonate, propylene carbonate, butene carbonate, and vinylene carbonate, chain carbonates such as dimethyl carbonate, diethyl carbonate, and methyl ethyl carbonate, chain esters such as methyl propionate, cyclic esters such as γ-butyrolactone, chain ethers such as dimethoxyethane, diethyl ether, diethylene glycol dimethyl ether, and triethylene glycol dimethyl ether, cyclic ethers such as tetrahydrofuran and 2-methyl-tetrahydrofuran, nitriles such as acetonitrile and propionitrile, or a mixture of these solvents.

[Battery Module]

According to a third aspect, this application relates to a battery module, including any one or more of the electrochemical apparatuses in the second aspect of this application.

Further, a quantity of the electrochemical apparatuses included in the battery module may be adjusted based on application and a capacity of the battery module.

Figure 14:
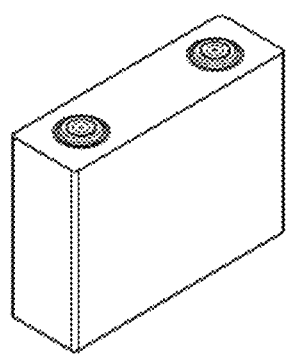
FIG. 14 is a schematic structural diagram of an electrochemical apparatus according to a specific embodiment of this application.
Figure 15:
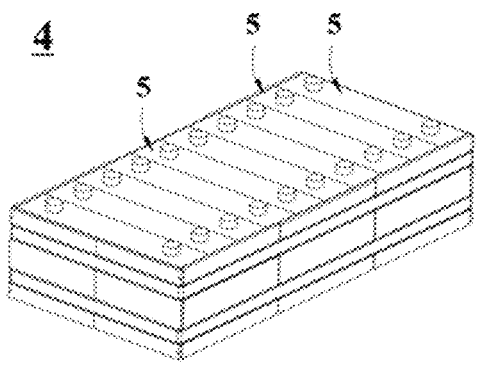
FIG. 15 is a schematic structural diagram of a battery module according to a specific embodiment of this application.

In some embodiments, referring to FIG. 14 and FIG. 15, in the battery module 4, a plurality of electrochemical apparatuses 5 may be sequentially arranged along a length direction of the battery module 4. Certainly, the apparatuses may be arranged in any other manner. Further, the plurality of electrochemical apparatuses 5 may be fastened by using fasteners.

In some embodiments, the battery module 4 may further include a housing with an accommodating space, and the plurality of electrochemical apparatuses 5 are accommodated in the accommodating space.

[Battery Pack]

According to a fourth aspect, this application relates to a battery pack, including any one or more of the battery modules in the third aspect of this application. In other words, the battery pack includes any one or more of the electrochemical apparatuses in the second aspect of this application.

A quantity of battery modules in the battery pack may be adjusted based on application and a capacity of the battery pack.

Figure 16:
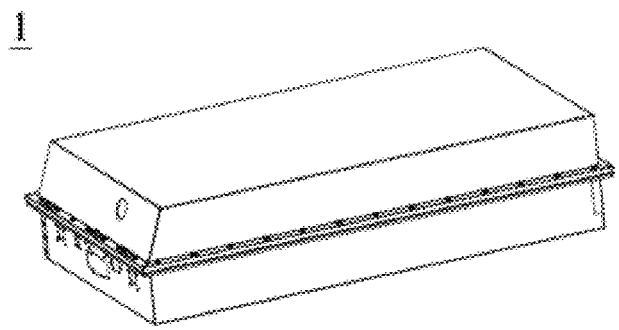
FIG. 16 is a schematic structural diagram of a battery pack according to a specific embodiment of this application.
Figure 17:
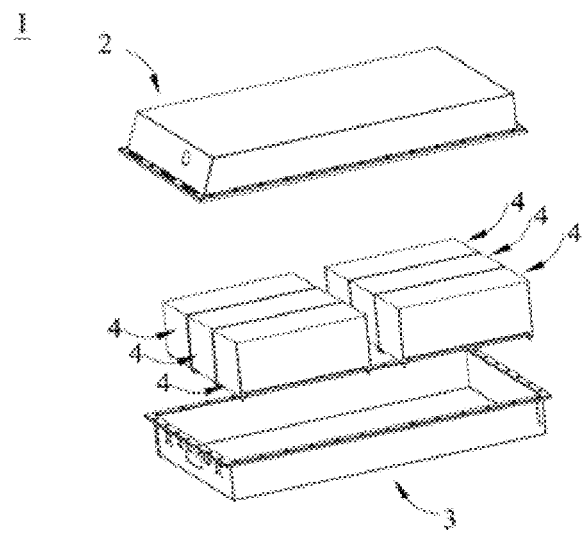
FIG. 17 is an exploded diagram of FIG. 16.

In some embodiments, referring to FIG. 16 and FIG. 17, the battery pack 1 may include a battery box and a plurality of battery modules 4 disposed in the battery box. The battery box includes an upper case 2 and a lower case 3. The upper case 2 can cover the lower case 3 to form an enclosed space for accommodating the battery modules 4. The plurality of battery modules 4 may be arranged in the battery box in any manner.

[Device]

According to a fifth aspect, this application relates to a device, including any one or more of the electrochemical apparatuses in the second aspect of this application. The electrochemical apparatus may be used as a power supply for the device.

In some embodiments, the device may be, but is not limited to, a mobile device (for example, a mobile phone or a notebook computer), an electric vehicle (for example, a full electric vehicle, a hybrid electric vehicle, a plug-in hybrid electric vehicle, an electric bicycle, an electric scooter, an electric golf vehicle, or an electric truck), an electric train, a ship, a satellite, an energy storage system, and the like.

Figure 18:
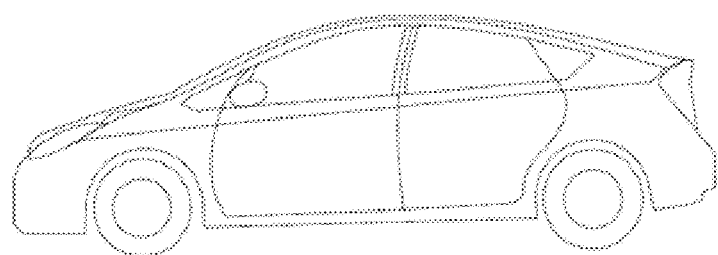
FIG. 18 is a schematic diagram of an implementation of a device using an electrochemical apparatus as a power supply.

For example, FIG. 18 shows a device including the electrochemical apparatus in this application. The device is a full electric vehicle, a hybrid electric vehicle, a plug-in hybrid electric vehicle, or the like. The electrochemical apparatus in this application supplies power to the device.

The foregoing battery module, battery pack, and device include the electrochemical apparatus provided in this application, and therefore have at least the same advantages as the electrochemical apparatus. Details are not described herein again.

Those skilled in the art can understand that, the various limitations or preferred ranges of component selection, component content, and material physical and chemical performance parameters of the conductive primer layer and the electrode active material layer in different implementations of the present application mentioned above may be freely combined, and various implementations obtained by their combinations are still within the scope of the present application and are considered part of the disclosure of this specification.

Unless otherwise specified, various parameters referred to in this specification have the common meaning known in the art, and can be measured by the methods known in the art. For example, a test can be performed according to the method given in the embodiment of the present application. In addition, the preferred ranges and options of various parameters given in various preferred implementations can be combined in any other manner, and the various combinations thus obtained are all considered to be within the scope of the disclosure of the present application.

Beneficial effects of the present application are further described below with reference to embodiments.

Embodiments

1. Preparation of a Current Collector Without a Protective Layer:

A support layer of a specific thickness is selected, and a conductive layer of a certain thickness is formed on its surface by means of vacuum evaporation, mechanical rolling or bonding.

Where, (1) The forming conditions of the vacuum evaporation method are as follows: The support layer subjected to a surface cleaning treatment is placed into a vacuum evaporation chamber, and high-purity metal wires in the metal evaporation chamber are melted and evaporated at a high temperature of 1600° C. to 2000° C. The evaporated metal goes through the cooling system in the vacuum evaporation chamber, and finally is deposited on the surface of the support layer to form a conductive layer.

(2) The forming conditions of the mechanical rolling method are as follows: The foil of the conductive layer material is placed in a mechanical roller, and rolling compacted to a predetermined thickness by applying a pressure of 20 t to 40 t, and then placed onto the surface of the support layer subjected to a surface cleaning treatment. Finally, the two are placed in the mechanical roller to be tightly bonded by applying a pressure of 30 t to 50 t.

(3) The forming conditions of the bonding method are as follows: The foil of the conductive layer material is placed in a mechanical roller, and rolling compacted to a predetermined thickness by applying a pressure of 20 t to 40 t, and then the surface of the support layer subjected to a surface cleaning treatment is coated with a mixed solution of PVDF and NMP. Finally, the conductive layer of the predetermined thickness are adhered to the surface of the support layer, and dried at 100° C.

2. Preparation of a Current Collector With a Protective Layer:

There are several ways to prepare a current collector with a protective layer:

(1) First, a protective layer is disposed on a surface of the support layer by a vapor deposition method or a coating method, and then a conductive layer of a specific thickness is formed on the surface of the support layer with the protective layer by means of vacuum evaporation, mechanical rolling or bonding to prepare a current collector with a protective layer (the protective layer is located between the support layer and the conductive layer). In addition, on the basis of the above, another protective layer is formed on the surface of the conductive layer away from the support layer by a vapor deposition method, an in-situ formation method, or a coating method to prepare a current collector with protective layers (the protective layers are located on two opposite surfaces of the conductive layer).

(2) First, a protective layer is formed on one surface of the conductive layer by a vapor deposition method, an in-situ formation method, or a coating method, and then the above conductive layer with the protective layer is disposed on the surface of the support layer by means of mechanical rolling or bonding, with the protective layer located between the support layer and the conductive layer, to prepare a current collector with a protective layer (the protective layer is located between the support layer and the conductive layer). In addition, on the basis of the above, another protective layer is formed on the surface of the conductive layer away from the support layer by a vapor deposition method, an in-situ formation method, or a coating method to prepare a current collector with protective layers (the protective layers are located on two opposite surfaces of the conductive layer).

(3) First, a protective layer is formed on one surface of the conductive layer by a vapor deposition method, an in-situ formation method, or a coating method, and then the above conductive layer with the protective layer is disposed on the surface of the support layer by means of mechanical rolling or bonding, with the protective layer located on the surface of the support layer away from the conductive layer, to prepare a current collector with a protective layer (the protective layer is located on the surface of the support layer away from the conductive layer).

(4) First, protective layers are formed on two surfaces of the conductive layer by a vapor deposition method, an in-situ formation method, or a coating method, and then the above conductive layer with the protective layers is disposed on the surface of the support layer by means of mechanical rolling or bonding to prepare a current collector with protective layers (the protective layers are located on two opposite surfaces of the conductive layer).

(5) On the basis of the above "preparation of a current collector without a protective layer", another protective layer is formed on the surface of the conductive layer away from the support layer by a vapor deposition method, an in-situ formation method, or a coating method to prepare a current collector with a protective layer (the protective layer is located on the surface of the support layer away from the conductive layer).

In the preparation instances, the vapor deposition method uses a vacuum evaporation method, the in-situ formation method uses an in-situ passivation method, and the coating method uses a doctor blade coating method.

The forming conditions of the vacuum evaporation method are as follows: A sample subjected to a surface cleaning treatment is placed into a vacuum evaporation chamber, and the protective layer material in the evaporation chamber is melted and evaporated at a high temperature of 1600° C. to 2000° C. The evaporated protective layer material goes through the cooling system in the vacuum evaporation chamber, and finally is deposited on the surface of the sample to form a protective layer.

The forming conditions of the in-situ passivation method are as follows: The conductive layer is placed in a high-temperature oxidation environment, the temperature is controlled at 160° C. to 250° C., and the oxygen supply is maintained in the high-temperature environment, and the processing time is 30 minutes, thereby forming a metal oxide type protective layer.

The formation conditions of the gravure coating method are as follows: The protective layer material and NMP are stirred and mixed, and then a slurry with the above protective layer material (solid content is 20% to 75%) is applied on a surface of the sample, and then the thickness of the coating is controlled by a gravure roller, and finally the coating is dried at 100° C. to 130° C.

(3) Preparation of an Electrode Plate:
1) Positive Electrode Plate of the Embodiments:

A specific proportion of conductive material (such as conductive carbon black) and binder (such as PVDF or polyacrylic acid) are dissolved in a suitable solvent (such as NMP or water), and stirred well to form a primer slurry.

The primer slurry is applied evenly on two sides of the composite current collector prepared according to the above method. The coating speed is 20 m/min, and the primer layer is dried with an oven temperature of 70° C. to 100° C. and a drying time of 5 minutes.

After the primer layer is completely dried, 92 wt % of the positive electrode active material, 5 wt % of the conductive agent Super-P ("SP" for short) and 3 wt % of PVDF are mixed with NMP as a solvent, and stirred well to prepare a positive electrode active material layer slurry. The positive electrode active material layer slurry is applied on the surface of the primer layer by extrusion coating, and dried at 85° C. to obtain a positive electrode active material layer.

Then, the current collector with each coating layer is cold-pressed, cut, and then dried under vacuum at 85° C. for 4 hours, and the electrode tabs are welded to obtain a positive electrode plate.

2) Comparative Positive Electrode Plate

The preparation is similar to the method of preparing the positive electrode plate of the above embodiment, but no primer layer is provided, and the positive electrode active material layer slurry is directly applied on the surface of the composite current collector.

3) Conventional Positive Electrode Plate:

The current collector is an Al foil with a thickness of 12 μm. Similar to the preparation method of the above comparative positive electrode plate, the positive electrode active material layer slurry is directly applied on the surface of the current collector of the Al foil, and then the conventional positive electrode plate is obtained by post-treatment.

4) Negative Electrode Plate of the Embodiments:

A specific proportion of conductive material (such as conductive carbon black) and binder (such as PVDF or polyacrylic acid) are dissolved in a suitable solvent (such as NMP or water), and stirred well to form a primer slurry.

The primer slurry is applied evenly on two sides of the composite current collector prepared according to the above method. The coating speed is 20 m/min, and the primer layer is dried with an oven temperature of 70° C. to 100° C. and a drying time of 5 minutes.

After the primer layer is completely dried, negative electrode active material artificial graphite, conductive agent Super-P, thickener CMC, and binder SBR are added to the solvent deionized water at a mass ratio of 96.5:1.0:1.0:1.5, and well mixed to prepare a negative electrode active material layer slurry. The negative electrode active material layer slurry is applied on the surface of the primer layer by extrusion coating, and dried at 85° C. to obtain a negative electrode active material layer.

Then, the current collector with each coating layer is cold-pressed, cut, and then dried under vacuum at 110° C. for 4 hours, and the electrode tabs are welded to obtain a negative electrode plate.

5) Comparative Negative Electrode Plate:

The preparation is similar to the method of preparing the negative electrode plate of the above embodiment, but no primer layer is provided, and the negative electrode active material layer slurry is directly applied on the surface of the composite current collector.

6) Conventional Negative Electrode Plate:

The current collector is a Cu foil with a thickness of 8 μm. Similar to the preparation method of the above comparative negative electrode plate, the negative electrode active material layer slurry is directly applied on the surface of the current collector of the Cu foil, and then the conventional negative electrode plate is obtained by post-treatment.

4. Preparation of a Battery

Through a common battery manufacturing process, wind a positive electrode plate (compaction density: 3.4 g/cm3), a PP/PE/PP separator, and a negative electrode plate (compaction density: 1.6 g/cm3) together to form a bare battery core, then place the bare battery core into a battery housing, inject the electrolyte (an EC:EMC volume ratio is 3:7, LiPF6 is 1 mol/L), and then perform sealing, formation and other processes to finally obtain a lithium-ion secondary battery (hereinafter referred to as the battery).

5. Battery Testing Method:
1. Lithium-Ion Battery Cycle Life Testing Method:

The lithium-ion battery is charged and discharged at 45° C., that is, charged to 4.2 V with a current of 1 C, and then discharged to 2.8 V with a current of 1 C, and the discharge capacity of the first cycle is recorded; then the battery is subjected to 1 C/1 C charge and discharge for 1000 cycles, the battery discharge capacity at the 1000th cycle is recorded. The discharge capacity at the 1000th cycle is divided by the discharge capacity at the first cycle to obtain the capacity retention rate at the 1000th cycle.

2) DCR Growth Rate Testing Method:

At 25° C., the secondary battery is adjusted to 50% SOC with a current of 1 C, and the voltage U1 is recorded. Then it is discharged with a current of 4 C for 30 seconds, and the voltage U2 is recorded. DCR=(U1−U2)/4 C. Then, the battery is subjected to 1 C/1 C charge and discharge for 500 cycles, and the DCR at the 500th cycle is recorded. The DCR at the 500th cycle is divided by the DCR at the first cycle and subtracted by 1 to obtain the DCR growth rate at the 500th cycle.

3) Needle Penetration Test:

The secondary batteries (10 samples) are fully charged to the cut-off voltage with a current of 1 C, and then charged at a constant voltage until the current drops to 0.05 C, and then charging stops. A φ8 mm high temperature resistant steel needle is used to penetrate at a speed of 25 mm/s from the direction perpendicular to the battery electrode plate, and the penetration position needs to be close to the geometric center of the punctured surface. Observe whether the battery has a phenomenon of burning and explosion while the steel needle stays in the battery.

6. Test Result and Discussion:
6.1 Effects of a Composite Current Collector on Improving the Weight Energy Density of the Battery The specific parameters of the current collector and the electrode plate of each embodiment are shown in Table 1 (the current collector of each embodiment listed in Table 1 is not provided with a protective layer). In Table 1, for the positive current collector, the percentage of the current collector by weight refers to the weight of the positive current collector per unit area divided by the weight of the conventional positive current collector per unit area. For the negative current collector, the percentage of the current collector by weight refers to the weight of the negative current collector per unit area divided by the weight of the conventional negative current collector per unit area.

TABLE 1

| Electrode plate No. | Current collector No. | Support layer Material | D1 | Conductive layer Material | D2 | Current collector Thickness | Percentage of current collector by weight |
|---|---|---|---|---|---|---|---|
| Positive electrode plate 1 | Positive current collector 1 | PI | 6 μm | Al | 300 nm | 6.6 μm | 30.0% |
| Positive electrode plate 2 | Positive current collector 2 | PET | 4 μm | Al | 500 nm | 5 μm | 24.3% |
| Positive electrode plate 3 | Positive current collector 3 | PET | 2 μm | Al | 200 nm | 2.4 μm | 11.3% |
| Conventional positive electrode plate | Conventional positive current collector | / | / | Al | / | 12 μm | 100% |
| Negative electrode plate 1 | Negative current collector 1 | PET | 5 μm | Cu | 500 nm | 6 μm | 21.6% |
| Negative electrode plate 2 | Negative current collector 2 | PI | 2 μm | Cu | 800 nm | 3.6 μm | 23.8% |
| Negative electrode plate 3 | Negative current collector 3 | PET | 8 μm | Cu | 1 μm | 10 μm | 39.6% |
| Negative electrode plate 4 | Negative current collector 4 | PET | 6 μm | Cu | 1.5 μm | 9 μm | 48.5% |
| Negative electrode plate 5 | Negative current collector 5 | PET | 4 μm | Cu | 1.2 μm | 6.4 μm | 37.3% |
| Negative electrode plate 6 | Negative current collector 6 | PET | 10 μm | Cu | 200 nm | 10.4 μm | 23.3% |
| Negative electrode plate 7 | Negative current collector 7 | PI | 8 μm | Cu | 2 μm | 12 μm | 65.3% |
| Conventional negative electrode plate | Conventional negative current collector | / | / | Cu | / | 8 μm | 100% |

As can be seen from Table 1, compared to the traditional current collectors, weights of the positive electrode plates and the negative electrode plates according to this application are reduced to some degrees, so that the weight energy density of the battery can be improved. However, when the thickness of the conductive layer is greater than 1.5 μm, the weight reduction degree of the current collector becomes smaller, especially for the negative electrode current collector.

6.2 Effects of a Protective Layer on Improving the Electrochemical Performance of the Composite Current Collector On the basis of the current collector of each embodiment listed in Table 1, a protective layer is further formed to investigate the effects of a protective layer on improving the electrochemical performance of the composite current collector. The "positive current collector 2-1" in Table 2 represents a current collector with a protective layer formed on the basis of the "positive current collector 2" in Table 1. The numbers of other current collectors have similar meanings.

TABLE 2

| Electrode plate No. | Current collector No. | Upper protective layer Material | D3' | Lower protective layer Material | D3" |
|---|---|---|---|---|---|
| Positive electrode plate 2-1 | Positive current collector 2-1 | Nickel oxide | 10 nm | Nickel oxide | 8 nm |
| Positive electrode plate 2-2 | Positive current collector 2-2 | Nickel oxide | 50 nm | Nickel oxide | 30 nm |
| Negative electrode plate 4-1 | Negative current collector 4-1 | / | / | Nickel | 200 nm |
| Negative electrode plate 4-2 | Negative current collector 4-2 | Nickel | 5 nm | / | / |
| Negative electrode plate 4-3 | Negative current collector 4-3 | Nickel-based alloy | 100 nm | / | / |
| Negative electrode plate 4-4 | Negative current collector 4-4 | Nickel | 10 nm | Nickel | 10 nm |
| Negative electrode plate 4-5 | Negative current collector 4-5 | Nickel | 50 nm | Nickel | 50 nm |
| Negative electrode plate 4-6 | Negative current collector 4-6 | Nickel | 100 nm | Nickel | 50 nm |

Table 3 shows the cyclic performance data measured after the battery is assembled by using the electrode plates listed in Table 2.

TABLE 3

| Battery No. | Electrode plate | | Capacity retention rate at the 1000th cycle at 45° C. |
|---|---|---|---|
| Battery 1 | Conventional negative electrode plate | Conventional positive electrode plate | 86.5% |
| Battery 2 | Conventional negative electrode plate | Positive electrode plate 2 | 80.7% |
| Battery 3 | Conventional negative electrode plate | Positive electrode plate 2-1 | 85.2% |
| Battery 4 | Conventional negative electrode plate | Positive electrode plate 2-2 | 85.4% |
| Battery 5 | Negative electrode plate 4 | Conventional positive electrode plate | 86.3% |
| Battery 6 | Negative electrode plate 4-1 | Conventional positive electrode plate | 87.1% |
| Battery 7 | Negative electrode plate 4-2 | Conventional positive electrode plate | 86.5% |
| Battery 8 | Negative electrode plate 4-3 | Conventional positive electrode plate | 86.7% |
| Battery 9 | Negative electrode plate 4-4 | Conventional positive electrode plate | 87.6% |
| Battery 10 | Negative electrode plate 4-5 | Conventional positive electrode plate | 87.8% |
| Battery 11 | Negative electrode plate 4-6 | Conventional positive electrode plate | 88.0% |

As shown in Table 3, compared with the battery 1 using the conventional positive electrode plate and the conventional negative electrode plate, the batteries using the current collectors of the embodiments of this application has a good cycle life and is equivalent to the conventional battery in cycle performance. Especially for a battery made of a current collector with a protective layer, compared to a battery made of a current collector without a protective layer, its capacity retention rate of the battery can be further improved, indicating that the battery is more reliable.

6.3 Effects of a Conductive Primer Layer on Improving the Electrochemical Performance of the Battery In the following, the positive electrode plate is taken as an example to illustrate the effects of a conductive primer layer and the composition of the conductive primer layer on improving the electrochemical performance of the battery. Table 4 shows the specific composition and related parameters of the batteries of each embodiment and comparative example, and the electrode plates and current collectors used therein. Table 5 shows the performance measurement results of each battery.

TABLE 4

| Electrode plate No. | Current collector No. | Support layer Material | D1 | Conductive layer Material | D2 | Conductive primer layer | Electrode active material layer |
|---|---|---|---|---|---|---|---|
| Comparative positive electrode plate 20 | Positive current collector 4 | PET | 10 μm | Al | 1 μm | / | NCM333, D50 9.8 μm, active material layer with a thickness of 55 μm |
| Positive electrode plate 21 | Positive current collector 4 | PET | 10 μm | Al | 1 μm | Conductive carbon black 10%, water-dispersible polyacrylic acid 90%, with a thickness of 1.5 μm | Same as above |
| Positive electrode plate 22 | Positive current collector 4 | PET | 10 μm | Al | 1 μm | Conductive carbon black 20%, water-dispersible polyacrylic acid 80%, with a thickness of 1.5 μm | Same as above |
| Positive electrode plate 23 | Positive current collector 4 | PET | 10 μm | Al | 1 μm | Conductive carbon black 50%, water-dispersible PVDF 50%, with a thickness of 1.5 μm | Same as above |
| Positive electrode plate 24 | Positive current collector 4 | PET | 10 μm | Al | 1 μm | Conductive carbon black 65%, water-dispersible PVDF 35%, with a thickness of 1.5 μm | Same as above |
| Positive electrode plate 25 | Positive current collector 4 | PET | 10 μm | Al | 1 μm | Conductive carbon black 80%, water-dispersible PVDF 20%, with a thickness of 1.5 μm | Same as above |
| Positive electrode plate 26 | Positive current collector 4 | PET | 10 μm | Al | 1μm | Conductive carbon black 99%, water-dispersible PVDF 1%, with a thickness of 1.5 μm | Same as above |
| Positive electrode plate 27 | Positive current collector 4 | PET | 10 μm | Al | 1 μm | Conductive carbon black 65%, oil-dispersible PVDF 35%, with a thickness of 1.5 μm | Same as above |
| Positive electrode plate 28 | Positive current collector 4 | PET | 10 μm | Al | 1 μm | Conductive carbon black 80%, oil-dispersible PVDF 20%, with a thickness of 1.5 μm | Same as above |
| Positive electrode plate 29 | Positive current collector 4 | PET | 10 μm | Al | 1 μm | Conductive carbon black 32.5%, flake conductive graphite (D50 0.05 μm) 32.5%, water-dispersible PVDF 35%, with a thickness of 1.5 μm | Same as above |
| Positive electrode plate 30 | Positive current collector 4 | PET | 10 μm | Al | 1 μm | Conductive carbon black 65%, water-dispersible PVDF 35%, with a thickness of 500 nm | Same as above |

TABLE 4-continued

| Electrode plate No. | Current collector No. | Support layer Material | Support layer D1 | Conductive layer Material | Conductive layer D2 | Conductive primer layer | Electrode active material layer |
|---|---|---|---|---|---|---|---|
| Positive electrode plate 31 | Positive current collector 4 | PET | 10 μm | Al | 1 μm | Conductive carbon black 65%, water-dispersible PVDF 35%, with a thickness of 2 μm | Same as above |
| Positive electrode plate 32 | Positive current collector 4 | PET | 10 μm | Al | 1 μm | Conductive carbon black 65%, water-dispersible PVDF 35%, with a thickness of 5 μm | Same as above |

TABLE 5

| Battery No. | Electrode plate | | DCR growth rate |
|---|---|---|---|
| Battery 20 | Comparative positive electrode plate 20 | Conventional negative electrode plate | 35% |
| Battery 21 | Positive electrode plate 21 | Conventional negative electrode plate | 30.9% |
| Battery 22 | Positive electrode plate 22 | Conventional negative electrode plate | 29% |
| Battery 23 | Positive electrode plate 23 | Conventional negative electrode plate | 20% |
| Battery 24 | Positive electrode plate 24 | Conventional negative electrode plate | 15% |
| Battery 25 | Positive electrode plate 25 | Conventional negative electrode plate | 14.5% |
| Battery 26 | Positive electrode plate 26 | Conventional negative electrode plate | 14% |
| Battery 27 | Positive electrode plate 27 | Conventional negative electrode plate | 18.5% |
| Battery 28 | Positive electrode plate 28 | Conventional negative electrode plate | 18.2% |
| Battery 29 | Positive electrode plate 29 | Conventional negative electrode plate | 12.9% |
| Battery 30 | Positive electrode plate 30 | Conventional negative electrode plate | 15.5% |
| Battery 31 | Positive electrode plate 31 | Conventional negative electrode plate | 14.6% |
| Battery 32 | Positive electrode plate 32 | Conventional negative electrode plate | 14.1% |

It can be seen from the above test data:

1. When a composite current collector with a thin conductive layer (that is, the comparative positive electrode plate 20 without a conductive primer layer) is used, the battery has a large DCR and a low cycle capacity retention rate due to the shortcomings such as a poorer conductivity of the composite current collector than a conventional metal current collector, and the conductive layer in the composite current collector susceptible to damage. However, after the conductive primer layer is introduced, by effectively mending and constructing a conductive network among the current collector, the conductive primer layer and the active material, the conductive primer layer improves the electron transfer efficiency, and reduces the resistance between the current collector and the electrode active material layer, so that the DCR can be effectively reduced.

2. With the increase of the content of the conductive agent in the conductive primer layer (the positive electrode plates 21 to 26), the DCR of the battery can be greatly reduced.

3. Under the same composition, the introduction of the water-dispersible binder can reduce the DCR more obviously than the oil-dispersible binder (positive electrode plate 24 vs. positive electrode plate 27 and positive electrode plate 25 vs. positive electrode plate 28).

4. The flake graphite can produce "horizontal sliding", achieving the function of buffering, reducing the damage to the conductive layer of the current collector during the compacting process, and reducing cracks. Therefore, the introduction of the flake graphite can further reduce the DCR of the battery (positive electrode plate 24 vs. positive electrode plate 29).

5. With the increase of the thickness of the conductive primer layer (positive electrode plate 30 vs. positive electrode plate 32), the DCR of the battery can be reduced more significantly. However, if the thickness of the conductive primer layer is too large, it is not conducive to the improvement of the energy density of the battery.

Additionally, the effects of different composition of the conductive material in the conductive primer layer on the battery performance are investigated separately. For the specific electrode plate composition and the measurement result of the battery performance, see Table 4-1 and Table 5-1.

TABLE 4-1

| Electrode plate No. | Current collector No. | Support layer Material | D1 | Conductive layer Material | D2 | Conductive primer layer | Electrode active material layer |
|---|---|---|---|---|---|---|---|
| Positive electrode plate 24 | Positive current collector 4 | PET | 10 μm | Al | 1 μm | Conductive carbon black 65%, water-dispersible PVDF 35%, with a thickness of 1.5 μm | NCM333, D50 9.8 μm, active material layer with a thickness of 55 μm |
| Positive electrode plate 24-A | Positive current collector 4 | PET | 10 μm | Al | 1 μm | Conductive carbon black 61.7%, carbon nanotubes 3.3%, water-dispersible PVDF 35%, with a thickness of 1.5 μm | Same as above |
| Positive electrode plate 24-B | Positive current collector 4 | PET | 10 μm | Al | 1 μm | Conductive carbon black 58.5%, carbon nanotubes 6.5%, water-dispersible PVDF 35%, with a thickness of 1.5 μm | Same as above |
| Positive electrode plate 24-C | Positive current collector 4 | PET | 10 μm | Al | 1 μm | Conductive carbon black 32.5%, carbon nanotubes 32.5%, water-dispersible PVDF 35%, with a thickness of 1.5 μm | Same as above |
| Positive electrode plate 24-D | Positive current collector 4 | PET | 10 μm | Al | 1 μm | Carbon nanotubes 65%, water-dispersible PVDF 35%, with a thickness of 1.5 μm | Same as above |
| Positive electrode plate 29 | Positive current collector 4 | PET | 10 μm | Al | 1 μm | Conductive carbon black 32.5%, flake conductive graphite (D50 0.05 μm) 32.5%, water-dispersible PVDF 35%, with a thickness of 1.5 μm | Same as above |

TABLE 5-1

| Battery No. | Electrode plate | DCR growth rate |
|---|---|---|
| Battery 24 | Positive electrode plate 24 | Conventional negative electrode plate | 15% |
| Battery 24-A | Positive electrode plate 24-A | Conventional negative electrode plate | 13.5% |
| Battery 24-B | Positive electrode plate 24-B | Conventional negative electrode plate | 13.2% |
| Battery 24-C | Positive electrode plate 24-C | Conventional negative electrode plate | 12% |
| Battery 27-D | Positive electrode plate 24-D | Conventional negative electrode plate | 13% |
| Battery 29 | Positive electrode plate 29 | Conventional negative electrode plate | 12.9% |

As can be seen from Table 4-1 and Table 5-1, it is preferable to contain at least one of the one-dimensional conductive material (carbon nanotube) and two-dimensional conductive material (flake conductive graphite) in the conductive material.

The flake graphite can produce "horizontal sliding", achieving the function of buffering, reducing the damage to the conductive layer of the current collector during the compacting process, and reducing cracks. Therefore, the introduction of the flake graphite can further reduce the DCR of the battery (positive electrode plate 24 vs. positive electrode plate 29).

From the positive electrode plate 24 to the positive electrode plate 24-A, 24-B, and 24-D, the conductive material is composed of zero-dimensional carbon (conductive carbon black) and one-dimensional carbon (carbon nanotube), where the proportion of one dimensional carbon gradually changes from 0% to 5%, 10%, 50%, and 100%. It can be seen from the DCR data that the DCR growth shows a trend of gradually decreasing and then increasing. This indicates that one-dimensional carbon (such as carbon nanotube) and zero-dimensional carbon (such as conductive carbon black) can be mixed to form a uniform conductive network by combining the points and lines, to effectively enhance the conductivity. The effect of only acetylene black or carbon nanotube is not as good as that of the conductive carbon combining the both.

Additionally, the effects of relative proportions of the water-dispersible binder and the oil-dispersible binder in the binder of the conductive primer layer are investigated separately. For the specific electrode plate composition and the measurement result of the battery performance, see Table 4-2 and Table 5-2

TABLE 4-2

| Electrode plate No. | Current collector No. | Support layer Material | D1 | Conductive layer Material | D2 | Conductive primer layer | Electrode active material layer |
|---|---|---|---|---|---|---|---|
| Positive electrode plate 24 | Positive current collector 4 | PET | 10 μm | Al | 1 μm | Conductive carbon black 65%, water-dispersible PVDF 35%, with a thickness of 1.5 μm | NCM333, D50 9.8 μm, active material layer with a thickness of 55 μm |
| Positive electrode plate 27-A | Positive current collector 4 | PET | 10 μm | Al | 1 μm | Conductive carbon black 65%, oil-dispersible PVDF 14%, water-dispersible polyacrylic acid 21%, with a thickness of 1.5 μm | Same as above |
| Positive electrode plate 27-B | Positive current collector 4 | PET | 10 μm | Al | 1 μm | Conductive carbon black 65%, oil-dispersible PVDF 24.5%, water-dispersible polyacrylic acid 10.5%, with a thickness of 1.5 μm | Same as above |
| Positive electrode plate 27 | Positive current collector 4 | PET | 10 μm | Al | 1 μm | Conductive carbon black 65%, oil-dispersible PVDF 35%, with a thickness of 1.5 μm | Same as above |

TABLE 5-2

| Battery No. | Electrode plate | DCR growth rate |
|---|---|---|
| Battery 24 | Positive electrode plate 24 | 15% |
| Battery 27-A | Positive electrode plate 27-A | 16.7% |
| Battery 27-B | Positive electrode plate 27-B | 17.5% |
| Battery 27 | Positive electrode plate 27 | 18.5% |

As can be seen from Table 4-2 and Table 5-2, with the proportion increase of the water-dispersible binder in the binder of the conductive primer layer (the proportions of water-dispersible binder in the positive electrode plate 27, 27-B, 27-A, and 24 are 0%, 30%, 60%, and 100% respectively), the DCR growth shows a trend of gradually decreasing, indicating that it is more advantageous to contain the water-dispersible binder in the binder of the conductive primer layer. Specifically, it is particularly preferable that the water-dispersible binder is 30% to 100% of total weight of the used binder in the conductive primer layer.

6.4 Effects of Types of Binders in the Conductive Primer Layer on the Process Stability It is already found that the binder in the conductive primer layer has a great effect on the stability of the primer layer slurry. Table 6 shows the settling performance of the conductive primer layer slurries with different composition. The testing method is: putting 80 ml of newly well-mixed slurry into a 100 ml beaker, and standing it for 48 hours, and then taking the slurry at the upper and lower layers separately to test the solid content. The larger the solid content difference is, the more severe the settlement is. Data in Table 6 indicates that the settling performance of the slurry is bad when water-dispersible PVDF is used, which is not condu-cive to the stability of the preparation process of the electrode plate; while the slurry is very stable and not suitable to settle when water-dispersible polyacrylic acid or water-dispersible sodium polyacrylate is used, and therefore the coating uniformity of the primer layer can be improved, further avoiding the phenomenon of lithium plating caused by uneven coating or concentration.

TABLE 6

| Slurry | Settling performance of slurry |
|---|---|
| Conductive carbon black 20%, water-dispersible polyacrylic acid 80% | Solid content at upper layer 33.5%, solid content at lower layer 35.2% |
| Conductive carbon black 20%, water-dispersible sodium polyacrylate 80% | Solid content at upper layer 33.8%, solid content at lower layer 34.9% |
| Conductive carbon black 20%, water-dispersible PVDF 80% | Solid content at upper layer 20.8%, solid content at lower layer 38.2% |

Therefore, in the conductive primer layer, compared with the oil-dispersible binder, the water-dispersible binder is more conducive to reducing the DCR of the battery. In the water-dispersible binder, it is preferable to use an acrylic based/acrylate based binder, such as at least one of polyacrylic acid, polyacrylate, sodium polyacrylate, lithium polyacrylate, polyacrylic acid-polyacrylonitrile copolymer, and polyacrylate-polyacrylonitrile copolymer.

6.5 Effects of the Content of the Binder in the Electrode Active Material Layer on Improving the Electrochemical Performance of the Battery When the content of the binder in the electrode active material layer is high, the bonding force between the active material layer and the primer layer is strong, and then the bonding force between the entire film layer (a collective term for the active material layer and the conductive primer layer) and the composite current collector is also strong. Therefore, under exceptions such as nail penetration, the active material layer (or film layer) can efficiently wrap the metal burrs generated in the conductive layer to improve the nail penetration safety performance of the battery.

In the following, the positive electrode plate is taken as an example to illustrate the effects of the content of the binder in the electrode active material layer on improving the electrochemical performance of the battery from the perspective of the safety of battery nail penetration.

The positive electrode plates are prepared according to the method described in the preceding embodiment, but the composition of the positive electrode active material layer slurry is adjusted to prepare a plurality of positive electrode plates with different binder contents in the positive electrode active material layer. The specific electrode plate composition is shown in the table below.

6.6 Surface Topography of the Composite Current Collector

Figure 13:
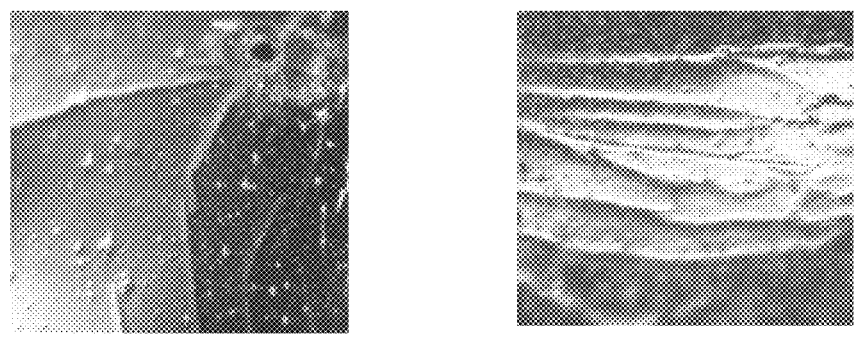
FIG. 13 is a surface microscopic observation diagram of a positive current collector according to a specific implementation of the present application.

During the preparation process of the positive electrode plate 24, take a small sample after cold pressing, and wipe the surface of the positive electrode plate 24 with a dust-free paper soaked in DMC solvent to expose the surface of the composite current collector. Use a CCD microscope to observe the surface topography, the observation diagram of which is shown in FIG. 13. From FIG. 13, obvious cracks can be seen. This kind of crack is unique to the surface of the conductive layer of the composite current collector, and it is not observed on the surface of the traditional metal current collector. When the conductive layer of the composite current collector is thin, cracks are likely to occur under pressure during the cold pressing process of the electrode

TABLE 7

| Electrode plate No. | Current collector No. | Support layer Material | D1 | Conductive layer Material | D2 | Conductive primer layer | Electrode active material layer |
|---|---|---|---|---|---|---|---|
| Positive electrode plate 33 | Positive current collector 4 | PET | 10 μm | Al | 1 μm | Conductive carbon black 65%, water-dispersible PVDF 35%, with a thickness of 1.5 μm | NCM811, D50 6.5 μm, active material layer with a thickness of 55 μm, 0.5 wt % of PVDF in binder |
| Positive electrode plate 34 | Positive current collector 4 | PET | 10 μm | Al | 1 μm | Conductive carbon black 65%, water-dispersible PVDF 35%, with a thickness of 1.5 μm | NCM811, D50 6.5 μm, active material layer with a thickness of 55 μm, 1 wt % of PVDF in binder |
| Positive electrode plate 35 | Positive current collector 4 | PET | 10 μm | Al | 1 μm | Conductive carbon black 65%, water-dispersible PVDF 35%, with a thickness of 1.5 μm | NCM811, D50 6.5 μm, active material layer with a thickness of 55 μm, 2 wt % of PVDF in binder |
| Positive electrode plate 36 | Positive current collector 4 | PET | 10 μm | Al | 1 μm | Conductive carbon black 65%, water-dispersible PVDF 35%, with a thickness of 1.5 μm | NCM811, D50 6.5 μm, active material layer with a thickness of 55 μm, 3 wt % of PVDF in binder |

Table 8 shows the nail penetration test results of the batteries assembled by the foregoing different positive electrode plates. The results show that the higher the content of the binder in the positive electrode active material layer, the better the nail penetration safety performance of the corresponding battery is. The content of the binder in the positive electrode active material layer is preferably not less than 1 wt %, and more preferably not less than 1.5 wt %.

TABLE 8

| Battery No. | Electrode plate | Nail penetration test result |
|---|---|---|
| Battery 33 | Positive electrode plate 33 Conventional negative electrode plate | 1 passed, 9 failed |
| Battery 34 | Positive electrode plate 34 Conventional negative electrode plate | 6 passed, 4 failed |
| Battery 35 | Positive electrode plate 35 Conventional negative electrode plate | All passed |
| Battery 36 | Positive electrode plate 36 Conventional negative electrode plate | All passed | plate processing. At this time, if there is a conductive primer layer, effectively mending and constructing a conductive network between the current collector and the active material can improve the electron transfer efficiency, and reduce the resistance between the current collector and the electrode active material layer, thereby effectively reducing the internal DC resistance in the battery core, improving the power performance of the battery core, and ensuring that the battery core is not prone to phenomena of a relatively large polarization and lithium plating during long-term cycling, that is, effectively improving the long-term reliability of the battery core. Specifically, the DCR growth is significantly reduced, thereby improving the battery performance. The above observation results give a possible theoretical explanation for the mechanism of action of the conductive primer layer, but it should be understood that the present application is not limited to this specific theoretical explanation.

Those skilled in the art can understand that the foregoing only shows the application instances of the electrode plate of the present application by taking the lithium battery as an example, however, the electrode plate of the present application can also be applied to other types of batteries or electrochemical apparatuses, and the good technical effects of the present application can still be achieved.

Based on the disclosure and teachings of the foregoing specification, a person skilled in the art may further make appropriate modifications and changes to the foregoing implementations. Therefore, the present application is not limited to the specific implementations disclosed and described above. Some changes and modifications to the present application shall also fall within the protection scope of the claims of the present application. In addition, although certain terms are used in the specification, these terms are merely used for ease of description and do not constitute any limitation on the present application.

What is claimed is:

1. An electrode plate, comprising a current collector and two electrode active material layers respectively disposed on two opposite surfaces of the current collector, wherein
the current collector comprises a support layer and two conductive layers respectively disposed on two opposite surfaces of the support layer, and a single-sided thickness D2 of each one of the two conductive layers satisfies: 30 nm≤D2≤3 µm;
the support layer is insulating and comprises an insulating polymer material or an insulating polymer composite material;
each one of the two conductive layers is a metal conductive layer comprising a material selected from aluminum, nickel, titanium, silver, nickel-copper alloy, aluminum-zirconium alloy, and any combination thereof; and
two conductive primer layers respectively disposed between the current collector and each one of the two electrode active material layers, the two conductive primer layers containing a conductive material and a binder, the binder containing an acrylic based or acrylate based water-dispersible binder,
the current collector further comprises:
an upper protective layer and a lower protective layer respectively disposed on two opposite surfaces of each one of the two conductive layers, wherein each of the upper protective layers is disposed between a respective one of the conductive layers and a respective one of the conductive primer layers, each of the lower protective layers is disposed between a respective one of the conductive layers and the support layer,
wherein, for each one of the two conductive layers, each one of the upper protective layer and the lower protective layer respectively disposed on the two opposite surfaces of said conductive layer is a metal oxide layer comprising one or more of aluminum oxide, cobalt oxide, chromium oxide, and nickel oxide,
wherein a thickness D3 of each of the upper protective layers or each of the lower protective layers satisfies: D3≤1/10 D2 and 1 nm≤D3≤200 nm,
wherein, for each one of the two conductive layers, a thickness of the upper protective layer disposed on one of the two opposite surfaces of said conductive layer D3 is denoted as D3', a thickness of the lower protective layer disposed on the other one of the two opposite surfaces of said conductive layer D3 is denoted as D3", D3' and D3" satisfy: ½ D3'≤D3"≤4/5 D3'.

2. The electrode plate according to claim 1, wherein
the insulating polymer material is one selected from at least one of polyamide, polyterephthalate, polyimide, polyethylene, polypropylene, polystyrene, polyvinyl chloride, aramid, polyphenylene diamide, acrylonitrile-butadiene-styrene copolymer, polybutylene terephthalate, polyparaphenylene terephthalamide, polypropylene, polyoxymethylene, epoxy resin, phenol-formaldehyde resin, polytetrafluoroethylene, polyphenylene sulfide, polyvinylidene fluoride, silicone rubber, polycarbonate, cellulose and its derivatives, starch and its derivatives, protein and its derivatives, polyvinyl alcohol and its cross-linked products, and polyethylene glycol and its cross-linked products; and
the insulating polymer composite material is one selected from a composite material formed of an insulating polymer material and an inorganic material, wherein the inorganic material is at least one of a ceramic material, a glass material, and a ceramic composite material.

3. The electrode plate according to claim 1, wherein a thickness D1 of the support layer satisfies: 1 µm≤D1≤30 µm; or
the room temperature Young's modulus of the support layer satisfies: 20 GPa≥E≥4 GPa; or there are cracks in the two conductive layers.

4. The electrode plate according to claim 3, wherein the thickness D1 of the support layer satisfies: 1 µm≤D1≤15 µm.

5. The electrode plate according to claim 1, wherein the single-sided thickness D2 of each one of the two conductive layers satisfies: 300 nm≤D2≤2 µm.

6. The electrode plate according to claim 5, wherein the single-sided thickness D2 of each one of the two conductive layers satisfies: 500 nm≤D2≤1.5 µm.

7. The electrode plate according to claim 1, wherein, for each one of the two conductive layers, the thickness D3 of the upper protective layer and the lower protective layer respectively disposed on the two opposite surfaces of said conductive layer satisfies: 10 nm≤D3≤50 nm.

8. The electrode plate according to claim 1, wherein, for each one of the conductive primer layers, based on the total weight of said conductive primer layer, the conductive material by weight is 10% to 99%, or the binder by weight is 1% to 90%.

9. The electrode plate according to claim 1, wherein the acrylic based/acrylate based water-dispersible binder is one selected from at least one of polyacrylic acid, polyacrylate, sodium polyacrylate, lithium polyacrylate, polyacrylic acid-polyacrylonitrile copolymer, and polyacrylate-polyacrylonitrile copolymer; or
the conductive material is at least one of a conductive carbon material and a metal material, wherein the conductive carbon material is one selected from at least one of: zero-dimensional conductive carbon, preferably acetylene black and/or conductive carbon black; one-dimensional conductive carbon, preferably carbon nanotube; two-dimensional conductive carbon, preferably conductive graphite and/or graphene; and three-dimensional conductive carbon, preferably reduced graphene oxide; and the metal material is one selected from at least one of aluminum powder, iron powder and silver powder; or
the conductive material preferably contains the one-dimensional conductive carbon material and/or the two-dimensional conductive carbon material, preferably the one-dimensional conductive carbon material and/or the two-dimensional conductive carbon material is 1 wt % to 50 wt % of the conductive material, and more preferably, the conductive material contains the one-dimensional conductive carbon material and the zero-dimensional conductive carbon material, or contains the two-dimensional conductive carbon material and the zero-dimensional conductive carbon material, or contains the one-dimensional conductive carbon material, the two-dimensional conductive carbon material and the zero-dimensional conductive carbon material.

10. The electrode plate according to claim 1, wherein, for each one of the two conductive primer layers, a single-sided thickness H of said conductive primer layer is 0.1 μm to 5 μm; or the acrylic based/acrylate based water-dispersible binder is 50 wt % to 100 wt % of the binder in said conductive primer layer.

11. The electrode plate according to claim 10, wherein a ratio of H to D2 is 0.5:1 to 5:1.

12. The electrode plate according to claim 1, wherein, for each one of the two the electrode active material layers, said electrode active material layer comprises an electrode active material, a binder, and a conductive agent, and an average particle size D50 of said electrode active material is 5 μm to 15 μm.

13. The electrode plate according to claim 12, wherein the binder in said electrode active material layer is not less than 1 wt %, based on a total weight of said electrode active material layer.

14. The electrode plate according to claim 1, wherein the metal oxide layer is a nickel oxide layer.

15. An electrochemical apparatus, comprising a positive electrode plate, a negative electrode plate, a separator separating the positive electrode plate from the negative electrode plate, and an electrolyte, wherein the positive electrode plate comprises a positive current collector and a positive electrode active material layer disposed on each one of two opposite surfaces of the positive current collector, and the negative electrode plate comprises a negative current collector and a negative electrode active material layer disposed on each one of the two opposite surfaces of the negative current collector, wherein, each one of the positive current collector and the negative current collector comprises a support layer and two conductive layers respectively disposed on two opposite surfaces of the support layer, and a thickness D2 of each of the conductive layers satisfies: 30 nm≤D2≤3 μm;

the support layer of the positive current collector and the support layer of the negative current collector are insulating and comprises an insulating polymer material or an insulating polymer composite material;

the two conductive layers of the positive current collector are each a metal conductive layer comprising a material selected from aluminum, nickel, titanium, silver, nickel-copper alloy, aluminum-zirconium alloy, and any combination thereof, and the two conductive layers of the negative current collector are each a metal conductive layer comprising a material selected from aluminum, copper, nickel, titanium, silver, nickel-copper alloy, aluminum-zirconium alloy, and any combination thereof; and in the positive electrode plate, two conductive primer layers are respectively disposed between the positive current collector and each one of the positive electrode active material layers, in the negative electrode plate, two conductive primer layers are respectively disposed between the negative current collector and each one of the two negative electrode active material layers, each one of the conductive primer layers comprises a conductive material and a binder, the binder containing an acrylic based or acrylate based water-dispersible binder, each one of the positive current collector and the negative current collector further comprises:

an upper protective layer and a lower protective layer respectively disposed on two opposite surfaces of each one of the two conductive layers, wherein each of the upper protective layers is disposed between a respective one of the conductive layers and a respective one of the conductive primer layers, each of the lower protective layers is disposed between a respective one of the conductive layers and the support layer, wherein for each one of the two conductive layers of the positive current collector, the upper protective layer and the lower protective layer respectively disposed on the two opposite surfaces of said conductive layer are metal oxide layers comprising one or more of aluminum oxide, cobalt oxide, chromium oxide, and nickel oxide, wherein, for each one of the two conductive layers of the negative current collector, each one of the upper protective layer and the lower protective layer respectively disposed on the two opposite surfaces of said conductive layer is a metal layer or a metal oxide layer, the metal oxide layer comprises one or more of aluminum oxide, cobalt oxide, chromium oxide, and nickel oxide, the metal layer comprise one or more of nickel, chromium, nickel-based alloy, and copper-based alloy, wherein a thickness D3 of each of the upper protective layers or each of the lower protective layers satisfies: D3≤1/10 D2 and 1 nm≤D3≤200 nm, wherein, for each one of the two conductive layers of each one of the positive current collector and the negative current collector, a thickness D3 of the upper protective layer disposed on one of the two opposite surfaces of said conductive layer is denoted as D3', a thickness D3 of the lower protective layer disposed on the other one of the two opposite surfaces of said conductive layer is denoted as D3", D3' and D3" satisfy: ½ D3'≤D3"≤4/5 D3'.

16. The electrochemical apparatus according to claim 7, wherein, for each one of the two conductive layers of the positive current collector, the upper protective layer disposed on one of the two opposite surfaces of said conductive layer is a nickel oxide layer, the lower protective layer disposed on the other one of the two opposite surfaces of said conductive layer is a nickel layer.

17. The electrochemical apparatus according to claim 16, wherein, for each one of the two conductive layers of the negative current collector, each one of the upper protective layer and the lower protective layer disposed respectively on the two opposite surfaces of said conductive layer is a nickel layer.

18. A device, comprising the electrochemical apparatus according to claim 15, wherein the electrochemical apparatus is used as a power supply for the device.

* * * * *